United States Patent
Park et al.

(10) Patent No.: US 12,538,307 B2
(45) Date of Patent: Jan. 27, 2026

(54) METHOD AND APPARATUS FOR UPLINK TRANSMISSION AND RECEPTION IN WIRELESS COMMUNICATION SYSTEM

(71) Applicant: LG Electronics Inc., Seoul (KR)

(72) Inventors: Haewook Park, Seoul (KR); Suckchel Yang, Seoul (KR); Duckhyun Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 536 days.

(21) Appl. No.: 17/969,327

(22) Filed: Oct. 19, 2022

(65) Prior Publication Data
US 2023/0345480 A1 Oct. 26, 2023

(30) Foreign Application Priority Data
Apr. 22, 2022 (KR) .......................... 10-2022-0050087

(51) Int. Cl.
*H04W 72/12* (2023.01)
*H04L 1/18* (2023.01)
(Continued)

(52) U.S. Cl.
CPC ....... *H04W 72/1273* (2013.01); *H04L 1/1812* (2013.01); *H04W 72/21* (2023.01)

(58) Field of Classification Search
CPC ......... H04W 72/1273; H04W 72/1284; H04W 72/21; H04W 72/23; H04W 84/06;
(Continued)

(56) References Cited

U.S. PATENT DOCUMENTS

2020/0413425 A1* 12/2020 Lin .................... H04L 1/1864
2021/0344455 A1* 11/2021 Choi ................. H04W 72/0446
(Continued)

FOREIGN PATENT DOCUMENTS

WO WO 2021/219087 11/2021
WO WO 2022/075344 4/2022

OTHER PUBLICATIONS

Extended European Search Report in European Appln. No. 22200900.3, mailed on May 15, 2023, 9 pages.
(Continued)

*Primary Examiner* — Rasheed Gidado
(74) *Attorney, Agent, or Firm* — Fish & Richardson P.C.

(57) ABSTRACT

A method and an apparatus of uplink transmission and reception in a wireless communication system is disclosed. A method of transmitting uplink control information by a terminal in a wireless communication system according to an embodiment of the present disclosure may include receiving, from a base station, a plurality of physical downlink shared channels (PDSCHs); and transmitting, to the base station, the uplink control information including Hybrid Automatic Repeat and reQuest-Acknowledgment (HARQ-ACK) information based on the plurality of PDSCHs. Here, the plurality of PDSCHs include a plurality of semi-persistent scheduling (SPS) PDSCHs, and based on HARQ-ACK information for the plurality of SPS PDSCHs being multiplexed by appending to pre-configured HARQ-ACK information, the HARQ-ACK information included in the uplink control information is determined by excluding at least one SPS PDSCH associated with a disabled HARQ process among the plurality of SPS PDSCHs.

16 Claims, 14 Drawing Sheets

(51) Int. Cl.
*H04L 1/1812* (2023.01)
*H04W 72/1273* (2023.01)
*H04W 72/21* (2023.01)

(58) Field of Classification Search
CPC ... H04L 1/1812; H04L 1/1854; H04L 1/1858; H04L 1/1896; H04L 5/0055; H04L 5/0098

See application file for complete search history.

(56) References Cited

U.S. PATENT DOCUMENTS

| | | | | |
|---|---|---|---|---|
| 2022/0007399 | A1* | 1/2022 | Rastegardoost | H04L 1/1861 |
| 2022/0109529 | A1* | 4/2022 | Ye | H04W 52/50 |
| 2022/0149996 | A1* | 5/2022 | Moon | H04L 5/0055 |
| 2022/0322313 | A1* | 10/2022 | Zhang | H04L 1/1861 |
| 2022/0322398 | A1* | 10/2022 | Tsai | H04W 72/23 |
| 2023/0299928 | A1* | 9/2023 | Ling | H04L 1/1854 |
| | | | | 370/329 |

OTHER PUBLICATIONS

Huawei, HiSilicon, "Maintenance on HARQ enhancement for NTN," 3GPP TSG-RAN WGl Meeting #108-e, R1-2200939, e-Meeting, Feb. 21-Mar. 3, 2022, 4 pages.

* cited by examiner

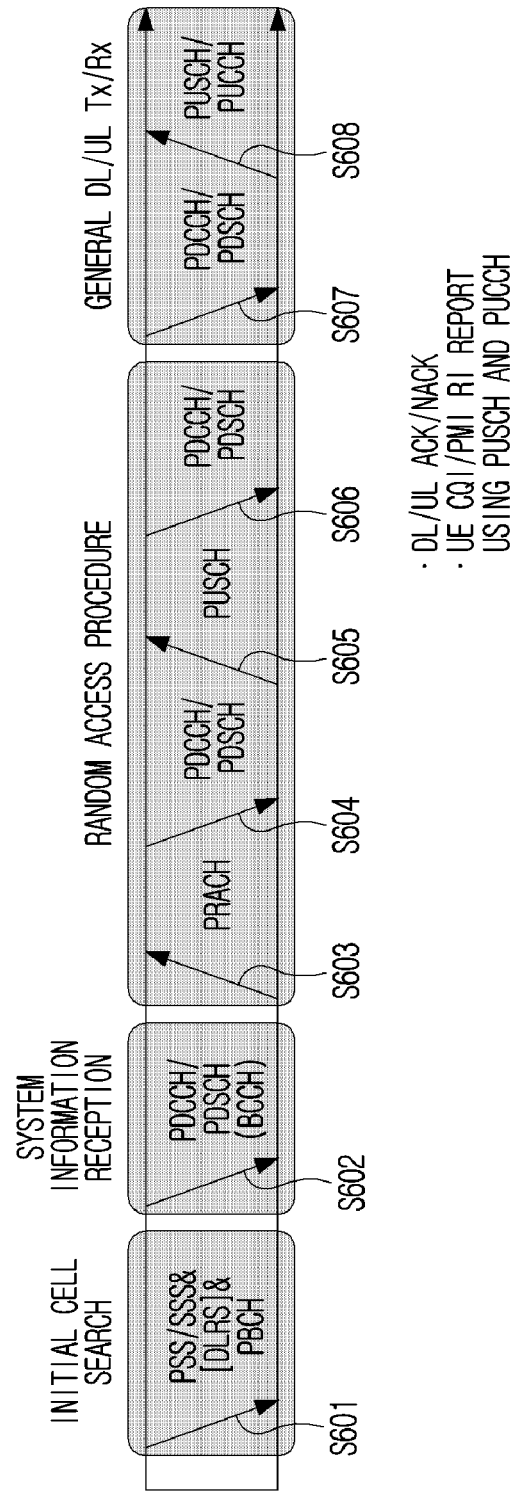

Regenerative payload

Transparent payload

FIG. 10
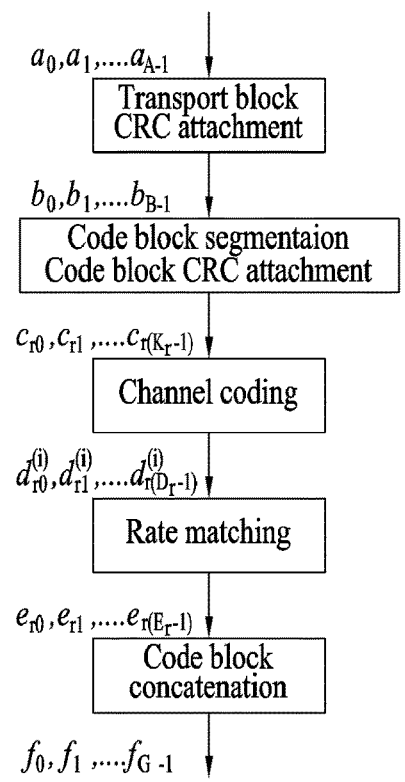
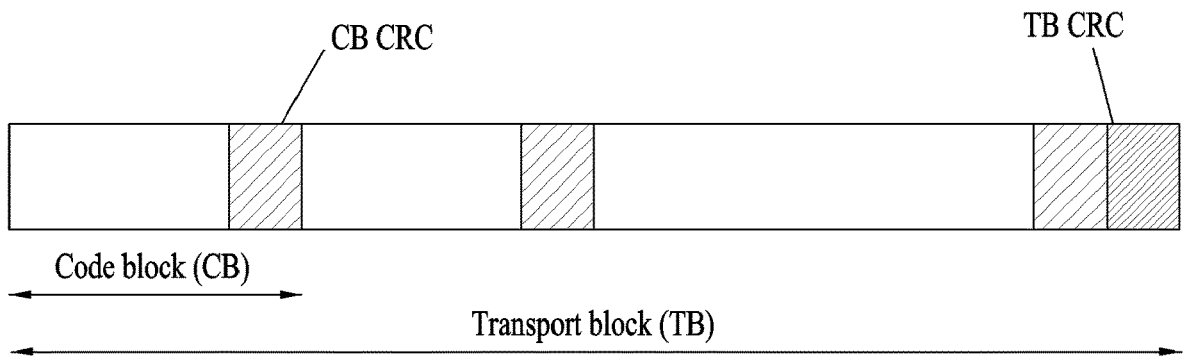

METHOD AND APPARATUS FOR UPLINK TRANSMISSION AND RECEPTION IN WIRELESS COMMUNICATION SYSTEM

CROSS-REFERENCE TO RELATED APPLICATIONS

This application claims the benefit of earlier filing date and right of priority to Korean Application No. 10-2022-0050087, filed on Apr. 22, 2022, the contents of which are all hereby incorporated by reference herein in their entirety.

TECHNICAL FIELD

The present disclosure relates to a wireless communication system, and in more detail, relates to a method and an apparatus of performing uplink transmission and reception in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and apparatus for performing uplink transmission and reception in a wireless communication system.

An additional technical object of the present disclosure is to provide a method and apparatus for determining/generating a HARQ-ACK codebook in consideration of whether a HARQ process (HARQ process) is enabled.

The technical objects to be achieved by the present disclosure are not limited to the above-described technical objects, and other technical objects which are not described herein will be clearly understood by those skilled in the pertinent art from the following description.

A method of transmitting uplink control information by a terminal in a wireless communication system according to an aspect of the present disclosure includes receiving, from a base station, a plurality of physical downlink shared channels (PDSCHs); and transmitting, to the base station, the uplink control information including Hybrid Automatic Repeat and reQuest-Acknowledgment (HARQ-ACK) information based on the plurality of PDSCHs. Here, the plurality of PDSCHs include a plurality of semi-persistent scheduling (SPS) PDSCHs, and based on HARQ-ACK information for the plurality of SPS PDSCHs being multiplexed by appending to pre-configured HARQ-ACK information, the HARQ-ACK information included in the uplink control information is determined by excluding at least one SPS PDSCH associated with a disabled HARQ process among the plurality of SPS PDSCHs.

A method of receiving uplink control information by a base station in a wireless communication system according to an additional aspect of the present disclosure includes transmitting, to a terminal, a plurality of physical downlink shared channels (PDSCHs); and receiving, from the terminal, the uplink control information including Hybrid Automatic Repeat and reQuest-Acknowledgment (HARQ-ACK) information based on the plurality of PDSCHs. Here, the plurality of PDSCHs include a plurality of semi-persistent scheduling (SPS) PDSCHs, and based on HARQ-ACK information for the plurality of SPS PDSCHs being multiplexed by appending to pre-configured HARQ-ACK information, the HARQ-ACK information included in the uplink control information is determined by excluding at least one SPS PDSCH associated with a disabled HARQ process among the plurality of SPS PDSCHs.

According to an embodiment of the present disclosure, a method and apparatus for uplink transmission and reception in a wireless communication system may be provided.

According to an embodiment of the present disclosure, a method and apparatus for determining/generating a HARQ-ACK codebook in consideration of whether the HARQ process is activated/enable may be provided.

According to an embodiment of the present disclosure, the ambiguity of the HARQ-ACK codebook configuration is removed by clarifying the HARQ-ACK codebook determination/generation method according to whether the HARQ process is activated/enabled, and the efficiency of the HARQ-ACK codebook configuration is increased.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

FIG. 10 illustrates a processing procedure and structure of a TB in a wireless communication system to which the present disclosure may be applied.

DETAILED DESCRIPTION

Figure 1:
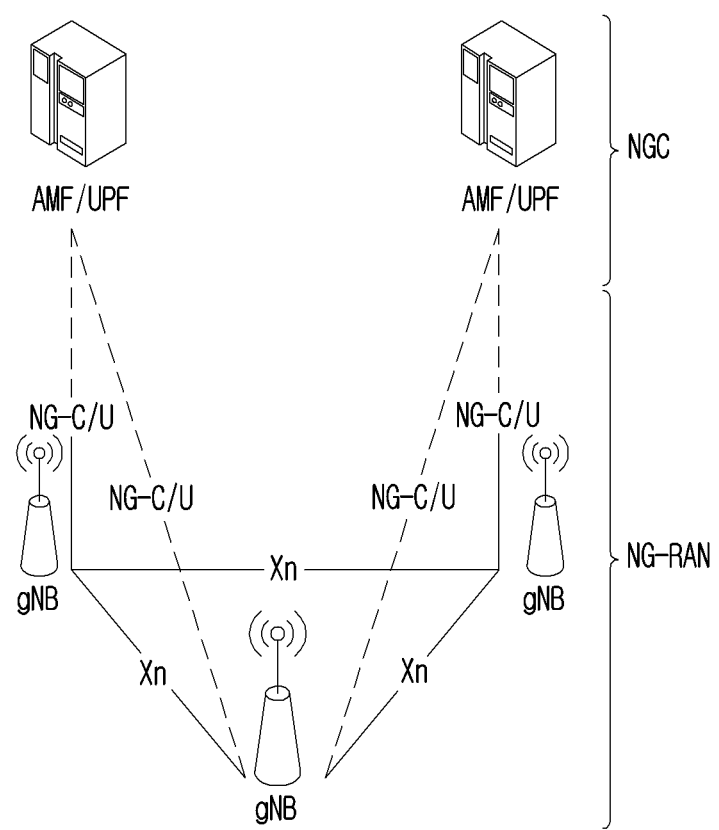
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, Terrestrial satellite base station, very-small-aperture terminal (VAST), gateway communicating with satellite, Integrated Access and Backhaul (IAB), etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, Terrestrial satellite base station, VAST, gateway communicating with satellite, IAB, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
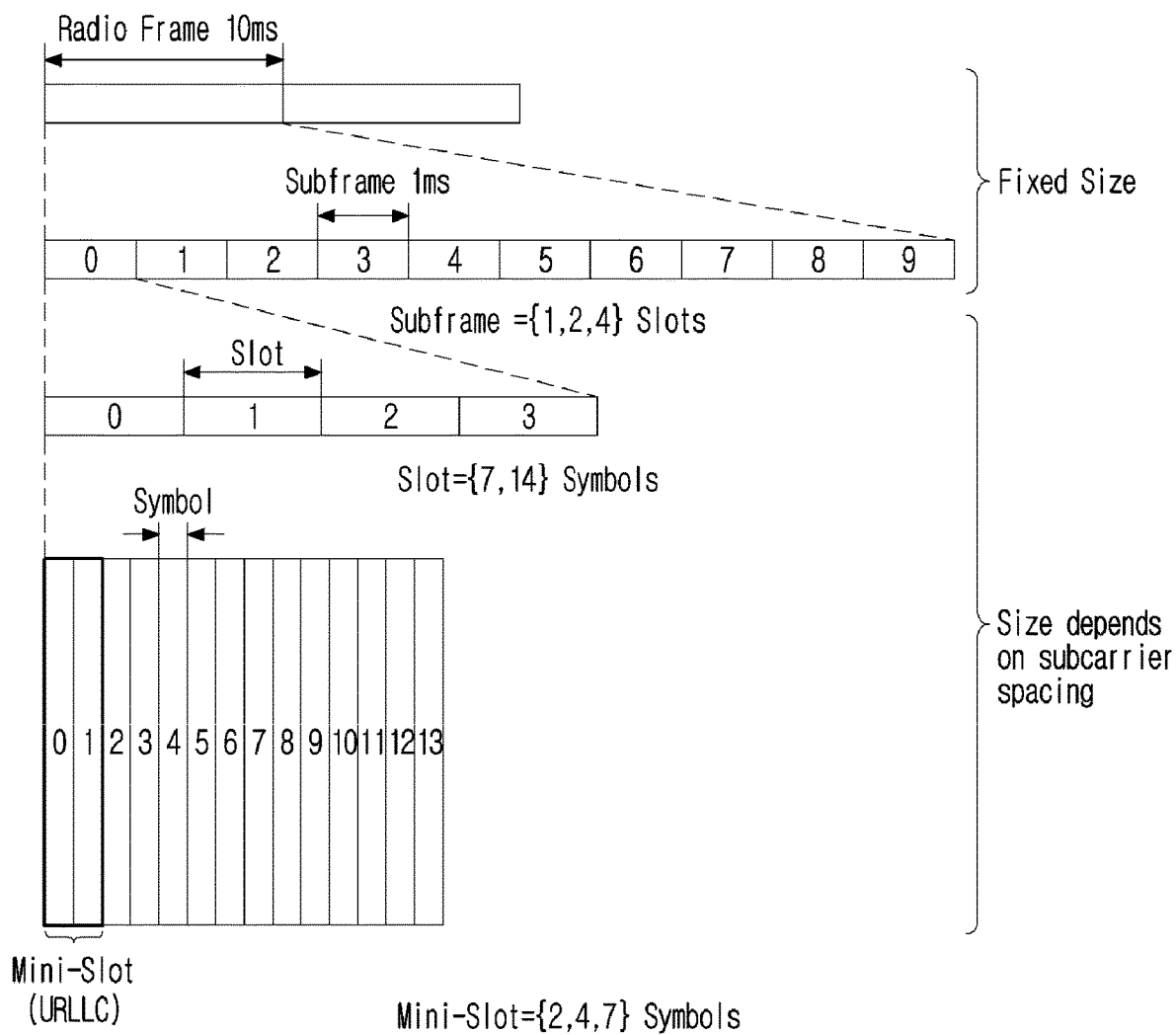
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf = 2μ · 15 [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 KHz |
| FR2 | 24250 MHz-52600 MHZ | 60, 120, 240 kHz |

Regarding a frame structure in an NR system, a size of a variety of fields in a time domain is expresses as a multiple of a time unit of Tc=1/(Δfmax·Nf). Here, Δfmax is 480.103 Hz and Nf is 4096. Downlink and uplink transmission is configured (organized) with a radio frame having a duration of Tf=1/(ΔfmaxNf/100)·Tc=10 ms. Here, a radio frame is configured with 10 subframes having a duration of Tsf= (ΔfmaxNf/1000)·Tc=1 ms, respectively. In this case, there may be one set of frames for an uplink and one set of frames for a downlink. In addition, transmission in an uplink frame No. i from a terminal should start earlier by TTA=(NTA+ NTA,offset)Tc than a corresponding downlink frame in a corresponding terminal starts. For a subcarrier spacing configuration μ, slots are numbered in an increasing order of nsμ∈{0, . . . , Nslotsubframe,μ−1} in a subframe and are numbered in an increasing order of ns,fμ∈{0, . . . , Nslotframe,μ−1} in a radio frame. One slot is configured with Nsymbslot consecutive OFDM symbols and Nsymbslot is determined according to CP. A start of a slot nsμ in a subframe is temporally arranged with a start of an OFDM symbol nsμNsymbslot in the same subframe. All terminals may not perform transmission and reception at the same time, which means that all OFDM symbols of a downlink slot or an uplink slot may not be used.

Table 3 represents the number of OFDM symbols per slot (Nsymbslot), the number of slots per radio frame (Nslotframe,μ) and the number of slots per subframe (Nslotsubframe,μ) in a normal CP and Table 4 represents the number of OFDM symbols per slot, the number of slots per radio frame and the number of slots per subframe in an extended CP.

TABLE 3

| μ | Nsymbslot | Nslotframe, μ | Nslotsubframe, μ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | Nsymbslot | Nslotframe, μ | Nslotsubframe, μ |
|---|---|---|---|
| 2 | 12 | 40 | 4 |

FIG. 2 is an example on μ1=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
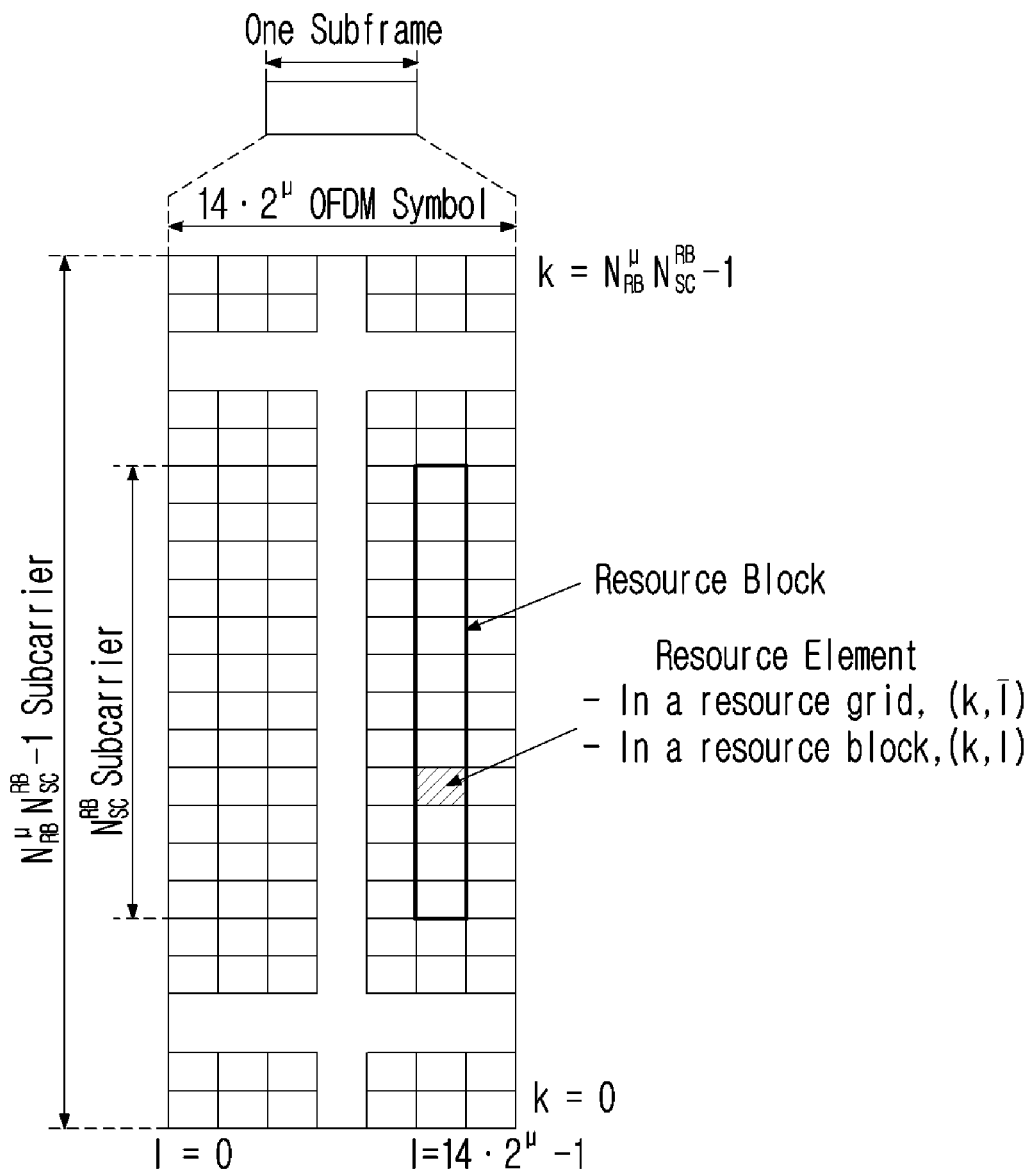
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with NRBμNscRB subcarriers in a frequency domain and one subframe is configured with 14·2μ OFDM symbols, but it is not limited thereto. In an NR system, a transmitted signal is described by OFDM symbols of 2μNsymb(μ) and one or more resource grids configured with NRBμNscRB subcarriers. Here, NRBμ≤NRBmax,μ. The NRBmax,μ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , NRBμNscRB−1 is an index in a frequency domain and l'=0, . . . , 2μNsymb (μ)−1 refers to a position of a symbol in a subframe. When referring to a resource element in a slot, an index pair (k,l) is used. Here, l=0, . . . , Nsymbμ−1. A resource element (k,l') for μ and an antenna port p corresponds to a complex value, ak,l'(p,μ). When there is no risk of confusion or when a specific antenna port or numerology is not specified, indexes p and μ may be dropped, whereupon a complex value may be ak,l'(p) or ak,l'. In addition, a resource block (RB) is defined as NscRB=12 consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number nCRBμ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to NBWP,isize,μ−1 in a bandwidth part (BWP) and i is a number of a BWP. A relationship between a physical resource block nPRB and a common resource block nCRB in BWP i is given by the following Equation 2.

$$n_{CRB}^{\mu} = n_{PRB}^{\mu} + N_{BWP,i}^{start,\mu} \quad \text{[Equation 2]}$$

NBWP,istart,μ s a common resource block that a BWP starts relatively to common resource block 0.

Figure 4:
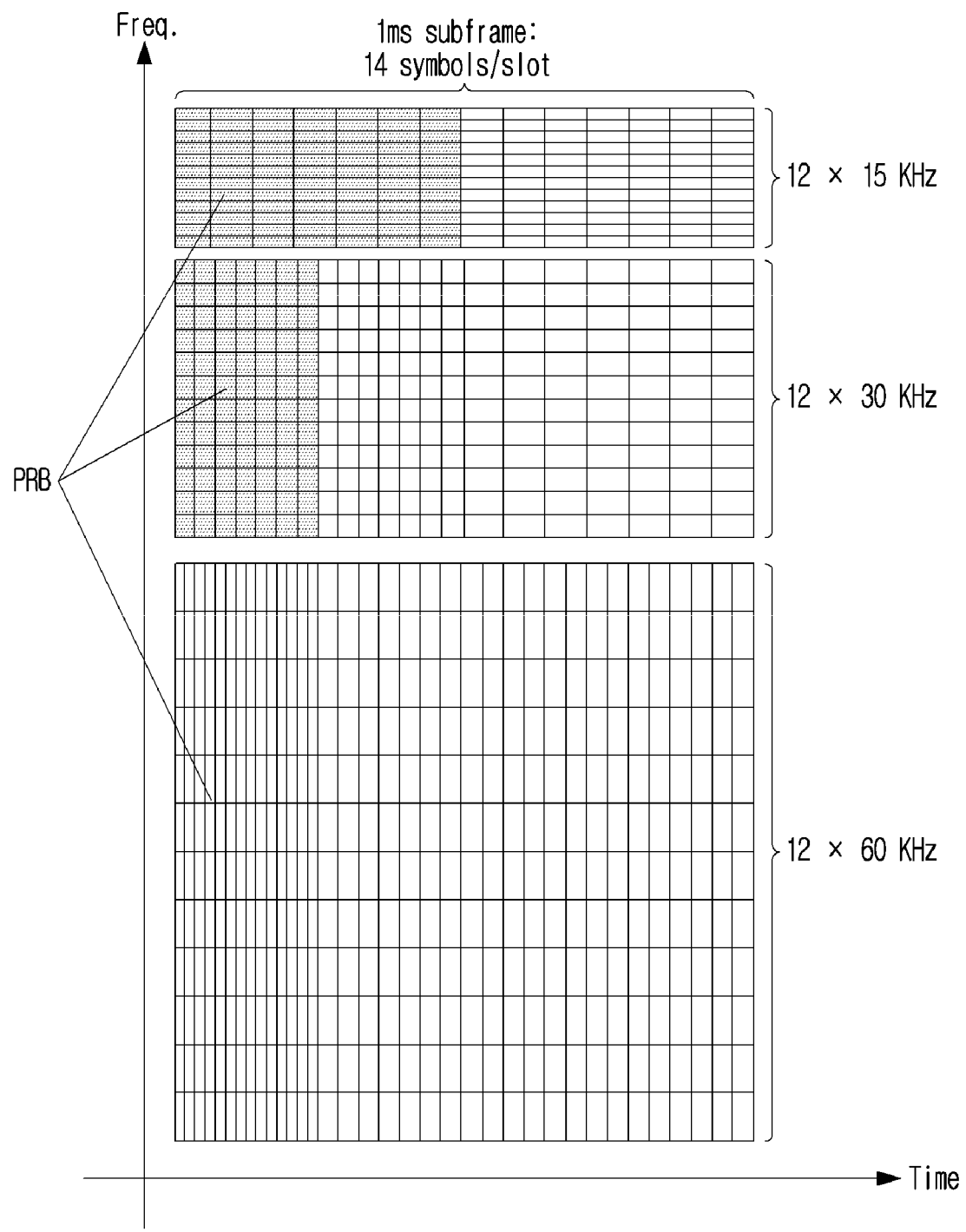
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
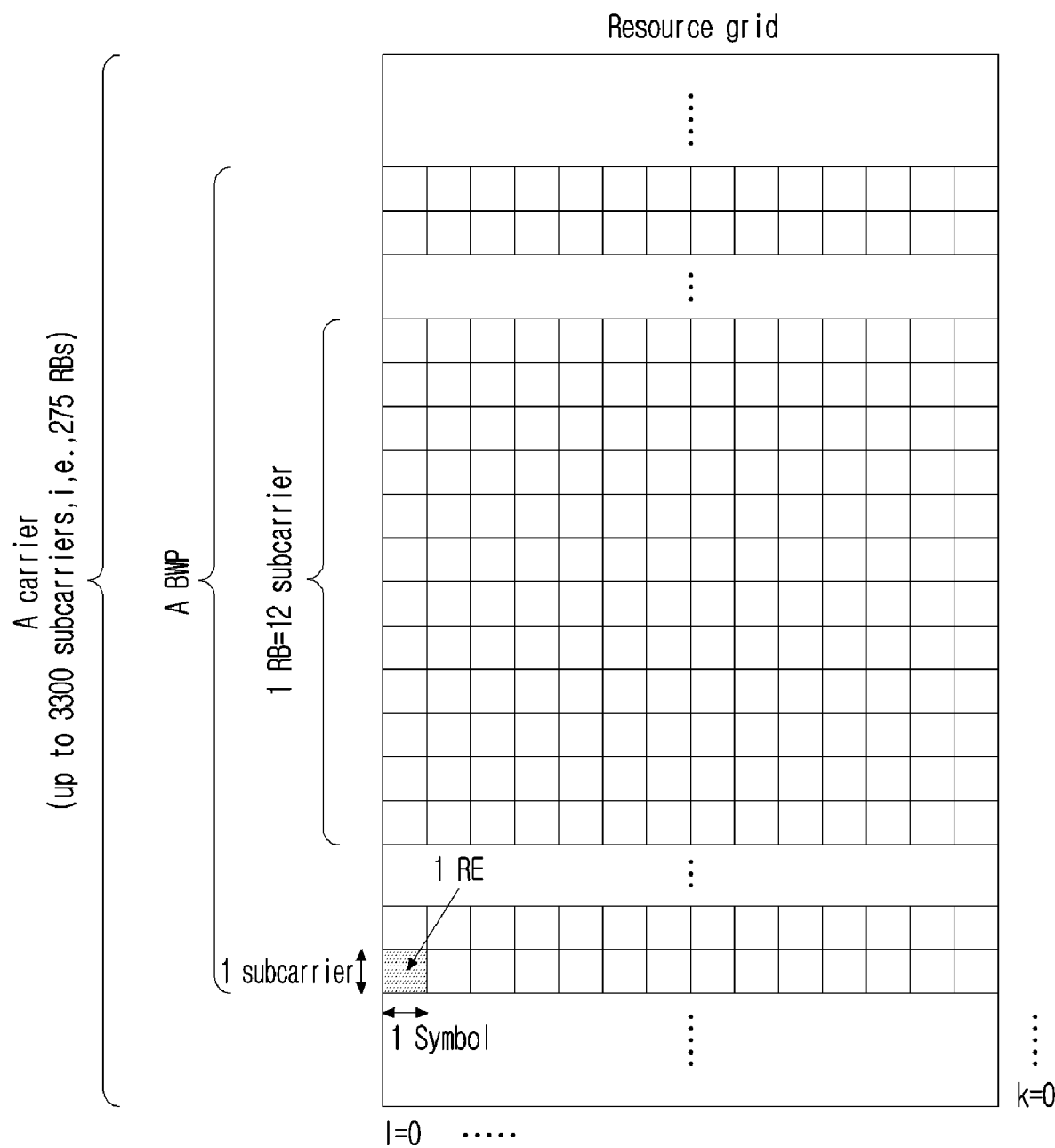
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth.

By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

A Wireless Communication System Supporting a Non-Terrestrial Network (NTN)

NTN means a network or a segment of a network configured to use a radio resource (RF resource) in a satellite or unmanned aircraft system (UAS) platform. In order to secure wider coverage or to provide a wireless communication service to a place where it is not easy to install a wireless communication base station, the use of the NTN service is being considered.

Here, the NTN service refers to providing a wireless communication service to terminals by installing a base station on an artificial satellite (e.g., geostationary-orbit, low-orbit, medium-orbit satellite, etc.), an airplane, unmanned airship, or drone, not a ground. In the following description, the NTN service may include an NR NTN service and/or an LTE NTN service. A terrestrial network (TN) service refers to providing a wireless communication service to terminals by installing a base station on the ground.

The frequency band considered for NTN service bay be, mainly, a 2 GHz band (S-band: 2-4 GHz) in the first frequency range (frequency range 1, FR1) (e.g., 410 MHz to 7.125 GHz), a downlink 20 GHz and an uplink 30 GHz band (Ka-Band: 26.5 to 40 GHz) in the 2 frequency range (FR2) (e.g., 24.25 GHz to 52.6 GHz). Additionally, the NTN service may be supported in a frequency band between 7.125 GHz and 24.25 GHz or in a frequency band of 52.6 GHz or higher.

Figure 7A:
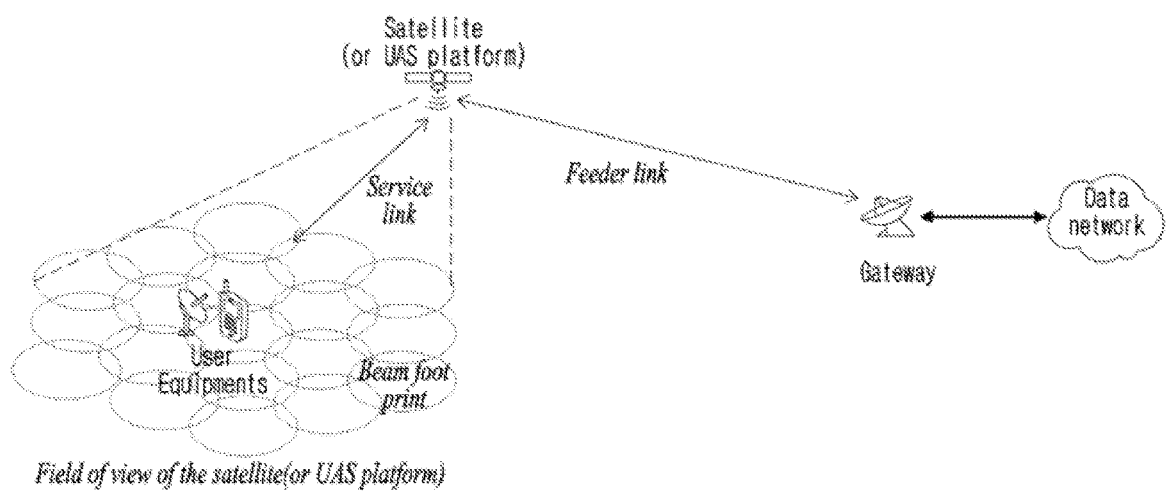
FIGS. 7A and 7B are diagrams for explaining NTN supported by a wireless communication system to which the present disclosure may be applied.
Figure 7B:
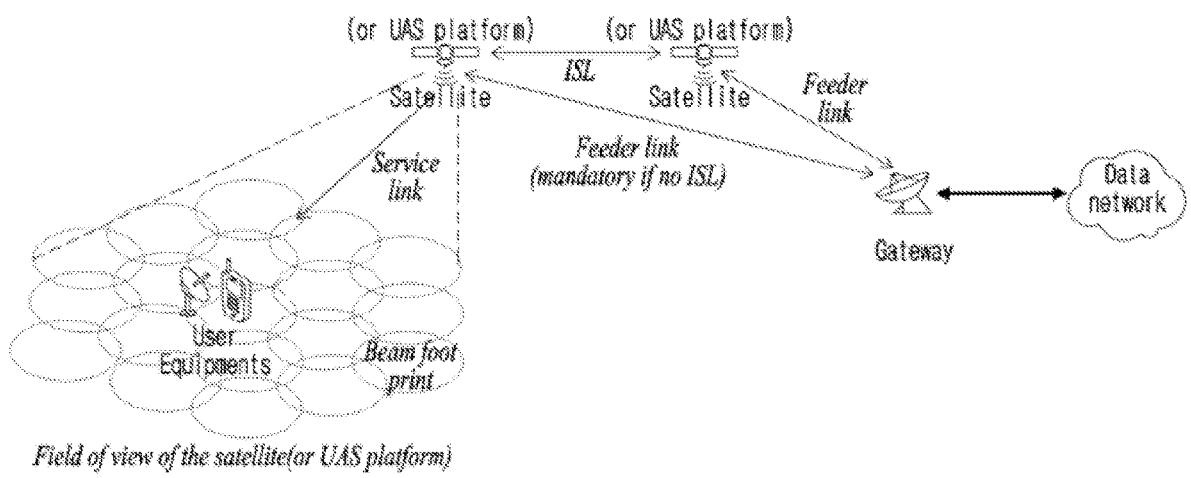

FIGS. 7A and 7B are diagrams for explaining NTN supported by a wireless communication system to which the present disclosure may be applied.

FIG. 7A illustrates an NTN scenario based on a transparent payload, and FIG. 7B illustrates an NTN scenario based on a regenerative payload.

Here, the NTN scenario based on the transparent payload is a scenario in which an artificial satellite that has received a payload from a terrestrial base station transmits the payload to the terminal, and the NTN scenario based on the regenerative payload means a scenario in which an artificial satellite is implemented as a base station (gNB).

NTNs are generally characterized by the following elements.

- one or more satellite-gateways for connecting NTN to public data networks:

A geostationary earth orbiting (GEO) satellite is supplied by one or more satellite-gateways that are deployed in coverage targeted by the satellite (eg, regional or continental coverage). A UE in a cell may be assumed to be served by only one satellite-gateway.

A non-GEO satellite may be successively served by one or more satellite-gateways. At this time, the wireless communication system guarantees service and feeder link continuity between the serving satellite-gateways for a time period sufficient to proceed with mobility anchoring and handover.

- a feeder link or radio link between the satellite-gateway and the satellite (or UAS platform)
- service link or radio link between the terminal and the satellite (or UAS platform)
- A satellite (or UAS platform) capable of implementing either a transparent or a regenerated (including on-board processing) payload.

Satellite (or UAS platform) generated beams generally generate a plurality of beams in a service area bounded by the field of view of the satellite (or UAS platform). The footprint of the beam is generally elliptical. The view of the satellite (or UAS platform) is determined by the onboard antenna diagram and the minimum elevation angle.

Transparent Payload: Radio Frequency Filtering, Frequency Conversion and Amplification. Accordingly, the waveform signal repeated by the payload is not changed.

Regenerative payload: radio frequency filtering, frequency conversion and amplification as well as demodulation/decoding, switching and/or routing, coding/modulation. This is practically equivalent to having all or some of the base station functions (eg gNB) in a satellite (or UAS platform).

- Inter-satellite links (ISL) for satellite populations. This requires a regeneration payload on the satellite. ISLs can operate at RF frequencies or wide bands.

The terminal is serviced by a satellite (or UAS platform) within the target service area.

Table 6 illustrates the types of satellite (or UAS platform).

TABLE 6

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35,786 km | notional station keeping position fixed in terms of elevation/azimuth | 200-3500 km |
| UAS platform (including HAPS) | 8-50 km (20 km for HAPS) | with respect to a given earth point | 5-200 km |
| High Elliptical Orbit (HEO) satellite | 400-50000 km | Elliptical around the earth | 200-3500 km |

In general, GEO satellites and UAS are used to provide continental, regional or local services. And, the constellation of low earth orbiting (LEO) and medium earth orbiting (MEO) is used to provide services in both the northern and southern hemispheres. Alternatively, the corresponding constellation may provide global coverage including the polar region. In the future, an appropriate orbital tilt, sufficient beams generated and inter-satellite links may be required. In addition, a highly elliptical orbiting (HEO) satellite system may be considered.

Hereinafter, a wireless communication system in NTN including the following six reference scenarios will be described.

- Circular orbiting and notational station keeping up platform
- Highest Round Trip Delay (RTD) constraint
- Highest Doppler constraint
- A transparent or A regenerated payload
- One ISL case and one without ISL. Regenerative payload is mandatory in the case of inter-satellite links.

The six reference scenarios are considered in Tables 7 and 8.

TABLE 7

| | Transparent satellite | Regenerative satellite |
|---|---|---|
| GEO based non-terrestrial access network | Scenario A | Scenario B |
| LEO based non-terrestrial access network: steerable beams | Scenario C1 | Scenario D1 |
| LEO based non-terrestrial access network: the beams move with the satellite | Scenario C2 | Scenario D2 |

TABLE 8

| Scenario | GEO based non-terrestrial access network (Scenario A and B) | LEO based non-terrestrial access network (Scenario C & D) |
|---|---|---|
| Orbit type | notional station keeping position fixed in terms of elevation/azimuth with respect to a given earth point | circular orbiting around the earth |
| Altitude | 35,786 km | 600 km<br>1,200 km |
| Spectrum (service link) | In FR1 (e.g. 2 GHz)<br>In FR2 (e.g. DL 20 GHz, UL 30 GHZ) | |
| Max channel bandwidth capability (service link) | 30 MHZ in FR1<br>1 GHz in FR2 | |
| Payload | Scenario A: Transparent (including radio frequency function only)<br>Scenario B: regenerative (including all or part of RAN functions) | Scenario C: Transparent (including radio frequency function only)<br>Scenario D: Regenerative (including all or part of RAN functions) |
| Inter-Satellite link | No | Scenario C: No<br>Scenario D: Yes/No (Both cases are possible.) |
| Earth-fixed beams | Yes | Scenario C1: Yes (steerable beams), Note 1<br>Scenario C2: No (the beams move with the satellite)<br>Scenario D 1: Yes (steerable beams), Note 1<br>Scenario D 2: No (the beams move with the satellite) |

TABLE 8-continued

| Scenario | GEO based non-terrestrial access network (Scenario A and B) | LEO based non-terrestrial access network (Scenario C & D) |
|---|---|---|
| Max beam foot print size (edge to edge) regardless of the elevation angle | 3500 km (Note 5) | 1000 km |
| Min Elevation angle for both sat-gateway and user equipment | 10° for service link 10° for feeder link | 10° for service link 10° for feeder link |
| Max distance between satellite and user equipment at min elevation angle | 40,581 km | 1,932 km (600 km altitude) 3,131 km (1,200 km altitude) |
| Max Round Trip Delay (propagation delay only) | Scenario A: 541.46 ms (service and feeder links) Scenario B: 270.73 ms (service link only) | Scenario C: (transparent payload: service and feeder links) 25.77 ms (600 km) 41.77 ms (1200 km) Scenario D: (regenerative payload: service link only) 12.89 ms (600 km) 20.89 ms (1200 km) |
| Max differential delay within a cell (Note 6) | 10.3 ms | 3.12 ms and 3.18 ms for respectively 600 km and 1200 km |
| Max Doppler shift (earth fixed user equipment) | 0.93 ppm | 24 ppm (600 km) 21 ppm (1200 km) |
| Max Doppler shift variation (earth fixed user equipment) | 0.000 045 ppm/s | 0.27 ppm/s (600 km) 0.13 ppm/s (1200 km) |
| User equipment motion on the earth | 1200 km/h (e.g. aircraft) | 500 km/h (e.g. high speed train), Possibly 1200 km/h (e.g. aircraft) |
| User equipment antenna types | Omnidirectional antenna (linear polarisation), assuming 0 dBi Directive antenna (up to 60 cm equivalent aperture diameter in circular polarisation) | |
| User equipment Tx power | Omnidirectional antenna: UE power class 3 with up to 200 mW Directive antenna: up to 20 W | |
| User equipment Noise figure | Omnidirectional antenna: 7 dB Directive antenna: 1.2 dB | |
| Service link | 3GPP defined New Radio | |
| Feeder link | 3GPP or non-3GPP defined Radio interface | 3GPP or non-3GPP defined Radio interface |

Note 1:
Each satellite has the capability to steer beams towards fixed points on earth using beamforming techniques. This is applicable for a period of time corresponding to the visibility time of the satellite Note 2:
Max delay variation within a beam (earth fixed user equipment) is calculated based on Min Elevation angle for both gateway and user equipment Note 3:
Max differential delay within a beam is calculated based on Max beam foot print diameter at nadir Note 4:
Speed of light used for delay calculation is 299792458 m/s.

Note 5:
The Maximum beam foot print size for GEO is based on current state of the art GEO High Throughput systems, assuming either spot beams at the edge of coverage (low elevation).

Note 6:
The maximum differential delay at cell level has been computed considering the one at beam level for largest beam size. A cell may include more than one beam when beam size are small or medium size. However the cumulated differential delay of all beams within a cell will not exceed the maximum differential delay at cell level in the table above.

In addition, the following describes a wireless communication system in the IoT NTN including the following five reference scenarios.

GEO and LEO Orbital Scenarios
No inter-satellite link
Transparent Payload
Beam foot print which is fixed or used on the ground, respectively, due to a fixed or adjustable beam
Band of interest below 6 GHz
The five reference scenarios are considered in Table 9.

TABLE 9

| | Transparent satellite |
|---|---|
| GEO based non-terrestrial access network | Scenario A |
| LEO based non-terrestrial access network generating steerable beams | Scenario B |
| LEO based non-terrestrial access network generating fixed beams whose footprint moves with the satellite | Scenario C |
| MEO based non-terrestrial access network generating fixed beams whose footprint moves with the satellite | Scenario D |

In this disclosure, NTN-related descriptions may be applied to NTN GEO scenarios and all NGSO (non-geostationary orbit) scenarios with circular orbits with an altitude of 600 km or more.

And, the above-described contents (NR frame structure, NTN, etc.) may be applied in combination with methods to be described later, and may be supplemented to clarify the technical characteristics of the method described in the present disclosure.

TA (Timing Advance) Value Configuration Method in NTN

In the TN, since the terminal moves within the cell, even if the distance between the base station and the terminal changes, the PRACH preamble transmitted by the terminal may be transmitted to the base station within the time duration of a specific RO (RACH occasion).

And, the TA value for the terminal to transmit an uplink signal/channel may be composed of an initial TA value and a TA offset value. Here, the initial TA value and the TA offset value may be indicated by the base station as a TA value expressible in the cell coverage range of the base station.

As another example, when the base station indicates a PDCCH order through DCI, the terminal may transmit a PRACH preamble to the base station. The terminal may transmit an uplink signal/channel to the base station using a TA value (i.e., an initial TA value) indicated through a response message (random access response, RAR) to the preamble received from the base station.

In NTN, the distance between the satellite and the terminal is changed due to the movement of the satellite regardless of the movement of the terminal. In order to overcome this, the terminal may determines the location of the terminal through the global navigation satellite system (GNSS), and the terminal may calculate a UE-specific TA which is a round trip delay (RTD) between the terminal and the satellite through orbit information of the satellite instructed by the base station.

Here, the UE-specific TA may be configured such that, when the PRACH preamble is transmitted from the RO selected by the UE, the satellite (or the base station (gNB)) may receive the PRACH preamble within the time period of the RO.

And, when only the UE-specific TA is applied when the PRACH preamble is transmitted from the RO selected by the UE, the PRACH preamble may be transmitted to the satellite (or gNB) with a delay from the reference time of the RO. In this case, the initial TA value indicated by the RAR received from the base station may indicate the delayed value.

Additionally, a common TA may mean an RTD between a gNB (or reference point) on the ground and a satellite. Here, the reference point may mean a place where downlink and uplink frame boundaries coincide. And, the common TA may be defined as that the base station indicates to the terminal. If the reference point is in the satellite, the common TA may not be indicated, and if the reference point is in the gNB on the ground, the common TA may be used to compensate for the RTD between the gNB and the satellite.

Additionally, in NTN, the TA value before message (Msg) 1 (e.g., PRACH preamble)/Msg A (e.g., PRACH preamble and PUSCH) transmission may be configured to UE-specific TA and common TA (if provided). Here, the UE-specific TA may be an RTD between the UE and the satellite calculated by the UE itself as described above.

Figure 8A:
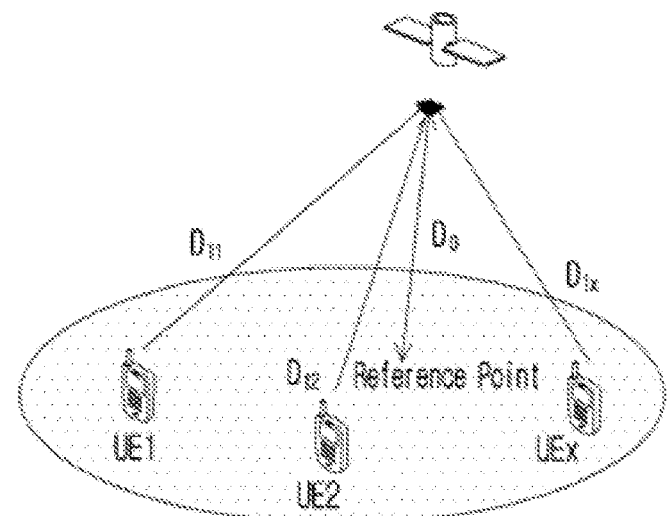
FIGS. 8A and 8B are diagrams for explaining TA in NTN supported by a wireless communication system to which the present disclosure may be applied.
Figure 8B:
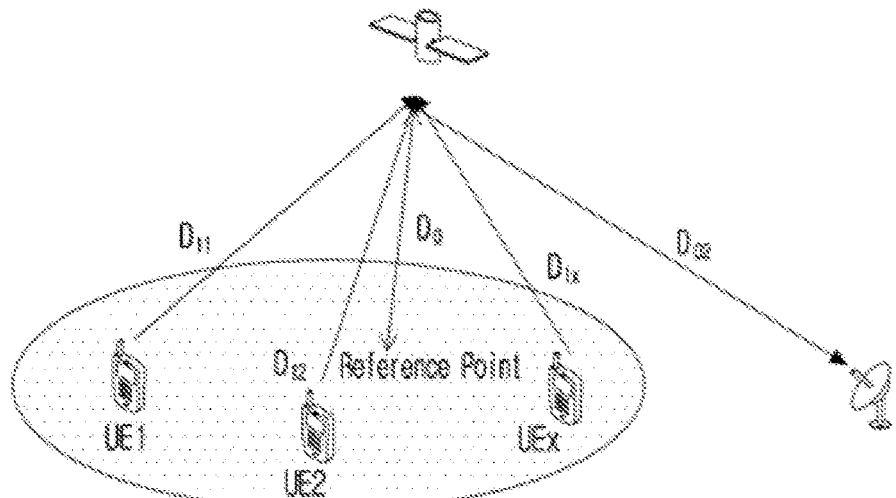

FIGS. 8A and 8B are diagrams for explaining TA in NTN supported by a wireless communication system to which the present disclosure may be applied.

FIG. 8A illustrates a regenerative payload based NTN scenario. The common TA (Tcom) (common to all terminals) may be calculated as 2D0 (distance between the satellite and the reference signal)/c, and the UE-specific differential TA (TUEx) for the x-th terminal (UEx) may be calculated as 2(D1x-D0)/c. The total TA (Tfull) may be calculated as 'Tcom+TUEx'. Here, D1x may mean a distance between the satellite and UEx. Here, c may represent the speed of light.

FIG. 8B illustrates a transparent payload based NTN scenario. The common TA (Tcom) (common to all terminals) may be calculated as 2(D01+D02)/c, and the UE-specific differential TA (TUEx) for the x-th terminal (UEx) may be calculated as 2(D1x-D0)/c. The total TA (Tfull) may be calculated as 'Tcom+TUEx'. Here, D01 may mean a distance between a satellite and a reference point, and D02 may mean a distance between a satellite and a base station located on the ground.

HARQ-ACK Related in NTN System

In the case of the NTN system, disabling of HARQ feedback may be supported in consideration of a latency problem due to a long RTT (long Round Trip Time). That is, in relation to the more delay-tolerant retransmission mechanism, HARQ disabling and HARQ optimization in NTN are considered.

First, in relation to HARQ disabling in NTN, when UL HARQ feedback is disabled, i) MAC-CE and RRC signaling may not be received by the terminal, or ii) DL packets may not be correctly received by the terminal during a long period in a state that the base station does not recognize.

Accordingly, when HARQ feedback is disabled, HARQ disabling may be indicated through DCI in a new/reinterpreted field, or a new UCI feedback operation for DL transmission interruption report and/or DL scheduling change request may be considered.

Next, with respect to HARQ optimization in NTN, methods for avoiding reduction of the peak data rate are considered. To avoid stop-and-wait in HARQ procedures, there is a method of increasing the number of HARQ processes to match the longer satellite round trip delay. And/or, there is also a method of disabling UL HARQ feedback to avoid stop-and-wait in the HARQ procedure, and relying on RCL ARQ for reliability.

Figure 9:
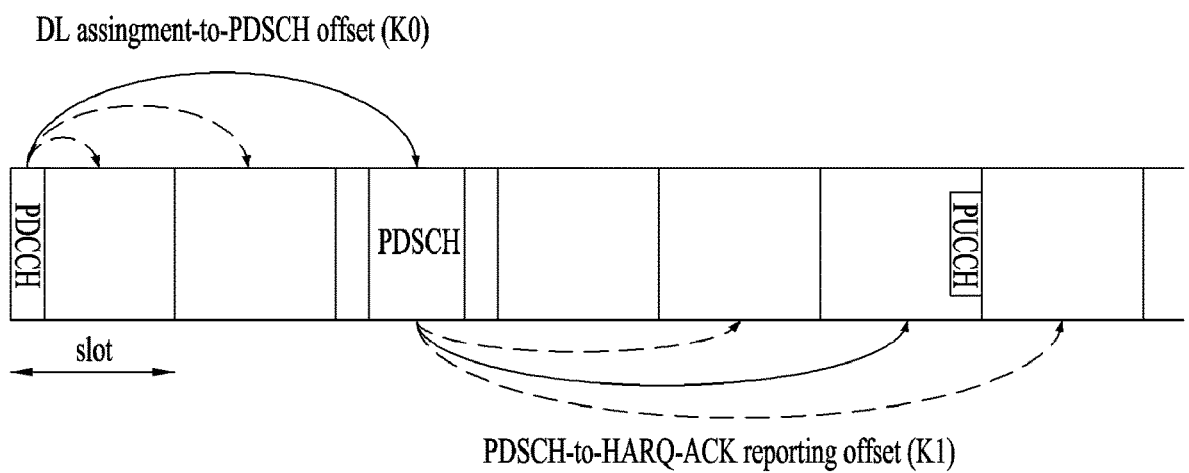
FIG. 9 illustrates a HARQ-ACK process for downlink data in a wireless communication system to which the present disclosure may be applied.

Data Transmission and HARQ (Hybrid Automatic Repeat and reQuest)-ACK (Acknowledgment) Process FIG. 9 illustrates a HARQ-ACK process for downlink data in a wireless communication system to which the present disclosure may be applied.

Referring to FIG. 9, a UE may detect a PDCCH in slot #n. Here, a PDCCH includes downlink scheduling information (e.g., DCI formats 1_0 and 1_1), and the PDCCH indicates a DL assignment-to-PDSCH offset (K0) and a PDSCH-HARQ-ACK reporting offset (K1). For example, DCI formats 1_0 and 1_1 may include the following information.

Frequency domain resource assignment: indicates a RB resource (e.g., one or more (dis-) continuous RBs) allocated to a PDSCH.

Time domain resource assignment: K0, indicates a starting position (e.g., OFDM symbol index) and a length (e.g., number of OFDM symbols) of a PDSCH in a slot PDSCH-to-HARQ feedback timing indicator: indicates K1.

HARQ process number (4 bits): indicates a HARQ process ID (Identity) for data (e.g., PDSCH, TB).

PUCCH resource indicator (PRI: PUCCH resource indicator): indicates a PUCCH resource to be used for UCI transmission among a plurality of PUCCH resources in a PUCCH resource set.

Thereafter, a UE may receive a PDSCH in a slot #(n+K0) according to scheduling information of slot #n, and then transmit UCI through PUCCH in a slot #(n+K1). Here, UCI includes a HARQ-ACK response for a PDSCH. If a PDSCH is configured to transmit up to 1 TB, a HARQ-ACK response may be configured with 1-bit. When a PDSCH is configured to transmit up to 2 TBs, a HARQ-ACK response may be configured with 2-bits when spatial bundling is not configured, and may be configured with 1-bits when spatial bundling is configured. When the HARQ-ACK transmission time for a plurality of PDSCHs is designated as a slot #(n+K1), UCI transmitted in a slot #(n+K1) includes HARQ-ACK responses for the plurality of PDSCHs.

CBG (Code Block Group)-Based HARQ Process

In LTE, a Transport Block (TB)-based HARQ process is supported. In NR, a CBG-based HARQ process is supported along with the TB-based HARQ process.

FIG. 10 illustrates a processing process and structure of a TB in a wireless communication system to which the present disclosure may be applied.

The procedure of FIG. 10 may be applied to data of a DL-Shared Channel (DL-SCH), a Paging Channel (PCH) and a Multicast Channel (MCH) transport channel. UL TB (or data of UL transport channel) may be similarly processed.

Referring to FIG. 10, a transmitter attaches a CRC (e.g., 24-bits) (TB CRC) to a TB for error checking. Thereafter, a transmitter may divide TB+CRC into a plurality of code blocks in consideration of a size of a channel encoder. As an example, the maximum size of a codeblock (CB) in LTE is 6144-bit. Accordingly, if a TB size is smaller than 6144-bit, a CB is not configured, and if a TB size is larger than 6144-bit, a TB is divided into 6144-bit size units to generate a plurality of CBs. A CRC (e.g., 24-bits) (CB CRC) is individually attached to each CB for error checking. After each CB is channel-coded and rate-matched, a codeword (CW) is generated by combining them into one. Data scheduling and a HARQ process according thereto are performed in units of TB, and CB CRC is used to determine early termination of TB decoding.

Figure 11:
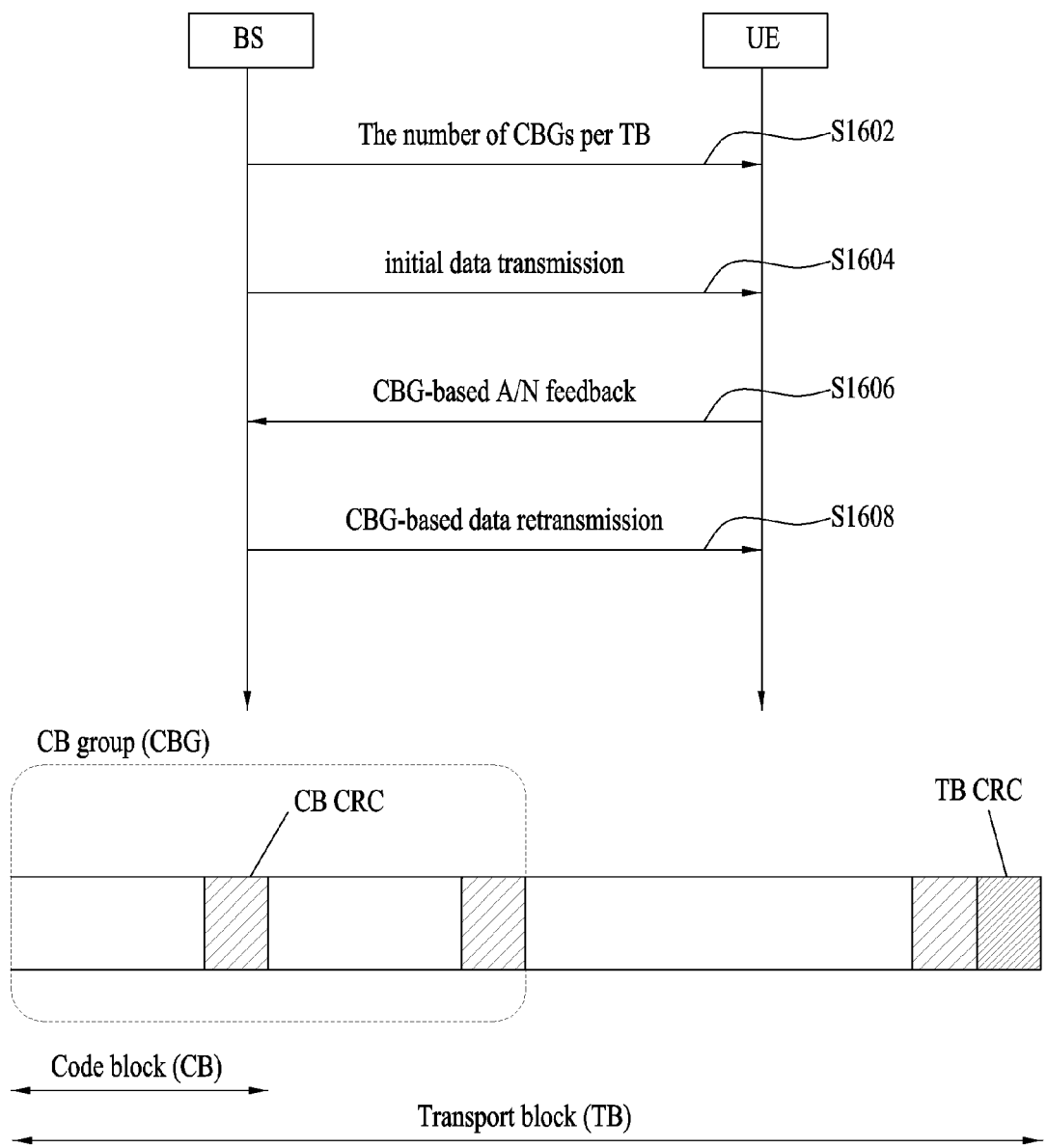
FIG. 11 illustrates a CBG-based HARQ process in a wireless communication system to which the present disclosure may be applied.

FIG. 11 illustrates a CBG-based HARQ process in a wireless communication system to which the present disclosure may be applied.

In a CBG-based HARQ process, data scheduling and a corresponding HARQ process may be performed in units of CBG.

Referring to FIG. 11, a UE may receive information on the maximum number M of codeblock groups (CBG) per transport block from a base station through a higher layer signal (e.g., RRC signal) (S1602). Thereafter, a UE may receive an initial data transmission (through PDSCH) from a base station (S1604). Here, data includes a TB, a transport block includes a plurality of CBs, and a plurality of CBs may be classified into one or more CBGs. Here, some of CBGs may include ceiling (K/M) number of CBs, and the remaining CBGs may include flooring (K/M) number of CBs. K represents the number of CBs in data. Thereafter, a UE may feed back CBG-based A/N information for data to a base station (S1606), and a base station may perform data retransmission based on a CBG (S1608). A/N information may be transmitted through PUCCH or PUSCH. Here, A/N information may include a plurality of A/N bits for data, and each A/N bit may indicate each A/N response generated in units of CBG for data. A payload size of A/N information may be maintained the same based on M regardless of CBG included in data.

Dynamic/Semi-Static HARQ-ACK Codebook Scheme

NR supports a dynamic HARQ-ACK codebook scheme and a semi-static HARQ-ACK codebook scheme. A HARQ-ACK (or A/N) codebook may be substituted with a HARQ-ACK payload.

When a dynamic HARQ-ACK codebook scheme is configured, a size of an A/N payload varies according to the actual number of scheduled DL data. To this end, a PDCCH related to DL scheduling includes a counter-downlink assignment index (counter-DAI) and a total-DAI. A counter-DAI indicates a {CC, slot} scheduling order value calculated in a CC (Component Carrier) (or cell)-first method, and is used to designate a position of an A/N bit in an A/N codebook. A total-DAI indicates a slot-unit scheduling accumulative value up to a current slot, and is used to determine a size of an A/N codebook.

When a semi-static A/N codebook scheme is configured, a size of an A/N codebook is fixed (to a maximum value) regardless of the actual number of scheduled DL data. Specifically, an (maximum) A/N payload (size) transmitted through one PUCCH in one slot may be determined by the number of corresponding A/N bits corresponding to a combination of all CCs configured for a UE and all DL scheduling slots (or PDSCH transmission slots or PDCCH monitoring slots) to which the A/N transmission timing can be indicated (hereinafter, bundling window). For example, DL grant DCI (PDCCH) includes PDSCH-to-A/N timing information, and the PDSCH-to-A/N timing information may have one (e.g., k) of a plurality of values. For example, when a PDSCH is received in slot #m, and PDSCH-to-A/N timing information in the DL grant DCI (PDCCH) scheduling the PDSCH indicates k, the A/N information for the PDSCH may be transmitted in slot #(m+k). As an example, k∈{1, 2, 3, 4, 5, 6, 7, 8} may be given. Meanwhile, when A/N information is transmitted in slot #n, the A/N information may include a maximum possible A/N based on a bundling window. That is, A/N information of slot #n may include an A/N corresponding to slot #(n−k). For example, if k∈{1, 2, 3, 4, 5, 6, 7, 8}, A/N information of slot #n includes A/Ns (i.e., the maximum number of A/Ns) corresponding to from slot #(n−8) to slot #(n−1) regardless of actual DL data reception. Here, A/N information may be substituted with an A/N codebook and an A/N payload. In addition, a slot may be understood as/substituted with a candidate occasion for DL data reception. As an example, a bundling window may be determined based on PDSCH-to-A/N timing based on an A/N slot, and a PDSCH-to-A/N timing set may has a pre-defined value (e.g., {1, 2, 3, 4, 5, 6, 7, 8}) or may be configured by higher layer (RRC) signaling.

A dynamic/semi-static HARQ-ACK codebook configuration defined in the NR standard is as follows. When a UE is configured with a PDSCH HARQ-ACK codebook (pdsch-HARQ-ACK-Codebook) parameter set to semi-static, the UE determines a Type-1 HARQ-ACK codebook report (i.e., a semi-static HARQ-ACK codebook). On the other hand, when a UE is configured with a PDSCH HARQ-ACK codebook (pdsch-HARQ-ACK-Codebook) (or pdsch-HARQ-ACK-Codebook-r16) parameter set to dynamic, the UE determines a Type-2 HARQ-ACK codebook report (i.e., a dynamic HARQ-ACK codebook).

HARQ-ACK Codebook Configuration Considering Whether HARQ Enable or not

The above description (e.g., NR frame structure, NTN system-related content, HARQ-ACK codebook determination/generation-related content, etc.) may be applied in combination with the proposed method(s) described later in this disclosure. And/or, the above description may be supplemented to clarify the technical characteristics of the proposed method(s) to be described later in the present disclosure.

HARQ disabling and/or HARQ enhancement related method(s), which will be described later in this disclosure, are related to uplink signal transmission, but may be equally extended and applied to a downlink signal transmission method in an NR system and/or an LTE system. In addition, so that the technical idea proposed in the present disclosure may be implemented in a corresponding system, the proposed method(s) can be modified or replaced to suit terms, expressions, structures, etc. defined in each system.

In order to guarantee wider coverage, or to support a wireless communication service in a place where it is not easy to install a wireless communication base station, the use of an NR NTN service and/or an LTE NTN service is being considered.

Existing terrestrial network (TN) services such as NR and LTE services provide a wireless communication service to terminals by installing a corresponding base station on the ground. On the other hand, the NTN service provides a wireless communication service to terminals by installing the base station on the place not located on the ground such as satellites (geostationary orbit, low orbit, medium orbit, etc.), airplanes, unmanned aerial vehicles, drones, etc., instead of installing the base station on the ground.

At this time, as the frequency band considered for the NR NTN service, mainly, 2 GHz band (e.g., S-band: 2-4 GHz) may be considered in the band below 6 GHz, the DL 20 GHz, UL 30 GHz band (e.g., Ka-Band: 26.5-40 GHz) may be considered in the band above 6 GHz.

Referring to Table 8 described above in relation to the NTN reference scenario (reference scenario), in the case of the worst case delay (i.e., GEO scenario A), the maximum delay may correspond to 540 ms. In this case, Latency problem in which the terminal performs HARQ feedback become longer due to the delay may occur.

Accordingly, in NR standardization, a method for enabling/disabling HARQ feedback to be configured for each UE and/or HARQ process has been discussed. When HARQ feedback may be disabling for each HARQ process, a discussion on how to process the HARQ-ACK codebook configuration/determination for the disabled HARQ process was conducted in the NR standardized Rel-17 NTN, and it was agreed to enhance the HARQ-ACK codebook for each type as shown in Table 10 below.

Table 10 shows an agreement related to enhancement of the HARQ-ACK codebook for each type in NR standardization.

TABLE 10

Agreement related Type 1 HARQ-ACK codebook
Agreement (RAN1#107-e)
For Type-1 HARQ codebook, the UE will consistently report NACK-only for the feedback-
disabled HARQ process regardless of decoding results of corresponding PDSCH.
Agreement related Type 2 HARQ-ACK codebook
Agreement (RAN1#104-e)
For Type-2 HARQ codebook in NTN: Reduce codebook size with HARQ-ACK codebook
only including HARQ-ACK of PDSCH with feedback-enabled HARQ processes
- FFS: The details of C-DAI and T-DAI counting for DCI of PDSCH with feedback-
enable/disabled H111ARQ processes
Agreement (RAN1#105-e)
For Type-2 HARQ codebook in NTN,
- For the DCI of PDSCH with feedback-enabled HARQ processes, the C-DAI and T-DAI
are the count of only feedback-enabled processes
- FFS: Whether DCI for SPS release and any other DCIs are included in counting of C-DAI
and T-DAI
Agreement (RAN1#106-e)
For the DCI of PDSCH with feedback-disabled HARQ processes, only one of following is
supported for Type-2 codebook:
- Option-1: The C-DAI and T-DAI are the count of feedback-enabled processes, despite
they are not incremented, and are taken into account by the UE for type 2 codebook
generation.
- Option-2: The C-DAI and T-DAI are ignored by the UE regardless of the value for Type 2
codebook generation.
Agreement related Type 3 HARQ-ACK codebook
Agreement (RAN1#107-e)
For Type-3 HARQ codebook in NTN, the UE should skip the codebook feedback for a
feedback-disabled HARQ processes
Note: The Type-3 codebook size is reduced by excluding the bit positions of disabled
HARQ processes Summing up with reference to Table 10, for the Type-1 HARQ-ACK codebook, which is a semi-static type, the decoding performance of the base station (e.g., gNB) may be improved by unconditionally reporting the report on HARQ-ACK information corresponding to a disabled HARQ process as NACK, without reducing the codebook size.

In the case of the Type-2 HARQ-ACK codebook, which is a dynamic type, the codebook size may be reduced in consideration of only the feedback-enabled (ie, feedback-enabled) HARQ process. In this regard, specific details for a counter downlink assignment indicator (C-DAI) and a total downlink assignment indicator (T-DAI) may be processed by the terminal implementation. For example, an operation may be performed in such a way that the terminal ignores the DAI value corresponding to the disabled HARQ process.

Even in the case of the Type-3 HARQ-ACK codebook, which is a semi-static type, the codebook size may be reduced in consideration of only the enabled HARQ process.

In addition, with respect to the activation/deactivation of the HARQ process, the HARQ feedback-related agreement for the SPS PDSCH was discussed, which is shown in Table 11.

Table 11 shows the HARQ feedback related agreement for SPS PDSCH in NR standardization.

TABLE 11

Agreement (RAN1#107-e)
HARQ feedback for SPS activation may be additionally enabled by the network by RRC
configuration.
- If enabled, UE reports ACK/NACK for the first SPS PDSCH after activation, regardless
of whether HARQ feedback is enabled or disabled corresponding to the first SPS PDSCH
after activation
- Otherwise, UE follows configuration of HARQ feedback enabled/disabled correspond-
ing
to the first SPS PDSCH after activation,
-- FFS between Alt1 and Alt2
[Alt-1: UE follows the per-process configuration of HARQ feedback enabled/disabled for
the associated HARQ process /Alt-2: UE follows the feedback-enabled/disabled
configuration of the SPS PDSCH]
Agreement (RAN1#107-e)
For HARQ feedback of each SPS PDSCH, UE follows the per-process configuration of
HARQ feedback enabled/disabled for the associated HARQ process, except for the first
SPS PDSCH after activation if HARQ feedback for SPS activation is additionally
enabled.

Referring to Table 11, in the case of SPS PDSCH, if feedback (i.e., HARQ feedback) for the first PDSCH is enabled through higher layer signaling (e.g., RRC signaling, etc.), the terminal need to report HARQ-ACK for the first PDSCH, regardless of enabling/disabling of the HARQ process corresponding to the first PDSCH configured for the terminal. That is, the HARQ-ACK information reporting for the first PDSCH is performed regardless of whether the HARQ process is enabled or not.

In this regard, in the case of the Type 2 HARQ-ACK codebook, if the terminal is configured to receive a plurality of SPS PDSCHs, the corresponding terminal is configured to append a HARQ-ACK codebook corresponding to the SPS PDSCH (i.e., HARQ-ACK bit(s)) to the Type 2 HARQ-ACK codebook. At this time, it may be ambiguous how to generate/determine/feedback the HARQ-ACK codebook for the SPS PDSCH. Referring to Table 12 below, in the case of the conventional method, if the terminal is configured to receive a plurality of SPS PDSCHs, the corresponding terminal is configured/defined to handle HARQ-ACK codebook for the SPS PDSCH according to clause 9.1.2, that is, the Type 1 HARQ-ACK codebook related content.

Table 12 shows the contents of processing HARQ-ACK information for the SPS PDSCH in relation to the Type 2 HARQ-ACK codebook in the NR system.

TABLE 12

TS 38.213, S 9.1.3.1
If a UE is configured to receive SPS PDSCH and the UE multiplexes HARQ-ACK information for one activated SPS PDSCH reception in the PUCCH in slo n, the UE generates one HARQ-ACK information bit associated with the SPS PDSCH reception and appends it to the OACK HARQ-ACK information bits.
If a UE is configured to receive SPS PDSCH and the UE multiplexes HARQ-ACK information for multiple activated SPS PDSCH receptions in the PUCCH in slot n, the UE generates the HARQ-ACK information as described in clause 9.1.2 and appends it to the OACK HARQ-ACK information bits.

Hereinafter, in the present disclosure, through the following examples to be described, a method (hereinafter, Embodiment 1) for solving the problem of ambiguity in the configuration of the HARQ-ACK codebook for the SPS PDSCH is proposed.

Embodiment 1

This embodiment relates to a method of generating/determining/feedback of the HARQ-ACK codebook for the SPS PDSCH in consideration of only the enabled HARQ process in relation to the Type 2 HARQ-ACK codebook configuration.

For example, when HARQ-ACK information for receiving a plurality of SPS PDSCHs for the Type 2 HARQ-ACK codebook is multiplexed, HARQ-ACK codebook corresponding to the SPS PDSCH appended to the Type 2 HARQ-ACK codebook may be configured in consideration of only the enabled HARQ process. Accordingly, since the HARQ-ACK codebook for the SPS PDSCH is configured in consideration of only the enabled HARQ process, the size of the corresponding codebook may be efficiently adjusted (i.e., reduced).

Specifically, the terminal may configure the HARQ-ACK codebook only for the SPS PDSCH(s) associated with the enabled HARQ process, and transmit by appending it to the Type 2 HARQ-ACK codebook corresponding to the DAI-based dynamic PDSCH. On the other hand, the terminal may not transmit HARQ-ACK information for the SPS PDSCH(s) related to the disabled HARQ process by excluding/omitting it from the HARQ-ACK codebook configuration/generation. That is, when the terminal configures/generates the HARQ-ACK codebook for the SPS PDSCH to be appended to the pre-configured/determined HARQ-ACK information (e.g., Type 2 HARQ-ACK codebook), HARQ-ACK bit(s) for the SPS PDSCH configured in association with the disabled HARQ process may be excluded.

In the case of the Type 2 HARQ-ACK codebook, as a dynamic codebook design, there is a purpose of effectively decreasing an uplink control information (UCI) overhead. In this regard, in NR standardization (eg, Rel-17 NTN), a method of reducing the size of the Type 2 HARQ-ACK codebook by considering only the enabled HARQ process was considered.

Therefore, even in the case of the HARQ-ACK codebook (i.e., HARQ-ACK information/bit) for the SPS PDSCH appended to the Type 2 HARQ-ACK codebook, a method of reducing the codebook size may be effective. For this, instead of reporting as NACK for all HARQ processes based on the Type 1 HARQ-ACK codebook (improved in NR standardization (e.g., Rel-17 NTN)), the terminal may exclude the HARQ-ACK bit for the disabled HARQ process and may report to the base station by appending only HARQ-ACK bit(s) corresponding to the remaining enabled HARQ processes to the Type 2 HARQ-ACK codebook.

In addition, as described above, enabling/disabling of HARQ feedback may be configured/indicated per process (i.e., HARQ process unit). The determination of the HARQ process ID may be based on the HARQ process ID determination equation in Table 13 below.

Table 13 shows the HARQ process ID determination related contents in the NR system.

TABLE 13

TS 38.321
For configured downlink assignments without harq-ProcID-Offset, the HARQ Process ID associated with the slot where the DL transmission starts is derived from the following equation:
- HARQ Process ID = [floor (CURRENT_slot × 10 / (numberOfSlotsPerFrame × periodicity))] modulo nrofHARQ-Processes
where CURRENT_slot = [(SFN × numberOfSlotsPerFrame) + slot number in the frame] and numberOfSlotsPerFrame refers to the number of consecutive slots per frame as specified in TS 38.211 [8].
- NOTE 1: In case of unaligned SFN across carriers in a cell group, the SFN of the concerned Serving Cell is used to calculate the HARQ Process ID used for configured downlink assignments.
For configured downlink assignments with harq-ProcID-Offset, the HARQ Process ID associated with the slot where the DL transmission starts is derived from the following equation:

TABLE 13-continued

- HARQ Process ID = [floor (CURRENT_slot × 10 / (numberOfSlotsPerFrame × periodicity))] modulo nrofHARQ-Processes + harq-ProcID-Offset
where CURRENT_slot = [(SFN × numberOfSlotsPerFrame) + slot number in the frame] and numberOfSlotsPerFrame refers to the number of consecutive slots per frame as specified in TS 38.211 [8].
- NOTE 2: CURRENT_slot refers to the slot index of the first transmission occasion of a bundle of configured downlink assignment.

Referring to Table 13, since the HARQ process ID (ie, HARQ process number (number)) may be determined based on the above-mentioned equation, the terminal may determine which any HARQ process among the HARQ processes corresponding to the SPS PDSCH is associated with the disabled HARQ process. Based on this, the terminal may configure/feedback the HARQ-ACK codebook for the SPS PDSCH appended to the Type 2 HARQ-ACK codebook in consideration of only the enabled HARQ process(s).

In addition, unlike the above example, for another example, the HARQ-ACK codebook for the SPS PDSCH appended to the Type 2 HARQ-ACK codebook may be configured/feedback by considering all of enabled HARQ process(s) and disabled HARQ process(s). That is, the terminal may configure/generate the HARQ-ACK codebook with actual ACK/NACK for the PDSCH associated therewith for all HARQ processes, regardless of the enabled HARQ process and the disabled HARQ process. In the case of this example, by explicitly reporting the ACK/NACK result for the SPS PDSCH, the accuracy of the MCS configuration of the base station for the disabled HARQ process, etc. may be increased, and thus the link performance may be improved.

In addition, as a special case for the example proposed in this embodiment, when all HARQ processes associated with the SPS PDSCH are disabled HARQ processes, the terminal may be configured/defined to omit reporting on the SPS PDSCH. That is, in the case where HARQ-ACK information for the SPS PDSCH is appended to the Type 2 HARQ-ACK codebook, if all HARQ processes for the SPS PDSCH are configured to disabled, the terminal appends 0 bit to the Type 2 HARQ-ACK codebook.

If all HARQ processes associated with the SPS PDSCH are disabled, similarly to the case of the Type 1 HARQ-ACK codebook configuration, all of the HARQ-ACK codebooks for the SPS PDSCH may be configured with NACK and appended. However, in this case, configuring the HARQ-ACK codebook (i.e., configuring with the NACK) is redundant and may be very inefficient in terms of resource utilization. Therefore, when all HARQ processes associated with the SPS PDSCH are disabled (i.e., feedback-disabled), it is efficient to omit the HARQ-ACK codebook configuration/feedback in terms of resource saving and reducing the complexity of the terminal.

Accordingly, as in the above-described manner, when the HARQ-ACK information for the reception of a plurality of SPS PDSCHs is multiplexed in the Type 2 HARQ-ACK codebook, if all HARQ processes associated with the SPS PDSCH appended to the Type 2 HARQ-ACK codebook are disabled HARQ processes, the terminal omits and does not report the HARQ-ACK codebook configuration/generation corresponding to the SPS PDSCH.

In addition, in the present disclosure, the following method (hereinafter, Embodiment 2) is proposed for the fallback operation of the Type 1 HARQ-ACK codebook associated with disabling of the above-described HARQ feedback.

Embodiment 2

This embodiment relates to a HARQ-ACK codebook configuration/generation method related to the fallback operation of the Type 1 HARQ-ACK codebook associated with disabling HARQ feedback.

For example, in a situation in which the Type 1 HARQ-ACK codebook is configured and the terminal receives one or more DCI and/or one or more PDSCHs (via DL slot(s) corresponding to the same UL slot), in case of one of the conditions to be described later is satisfied, the terminal may operate to feedback/transmit only HARQ-ACK bits corresponding to DCI/PDSCH(s) associated with the enabled HARQ process to the base station.

Condition 1. In case of that the UE receives a DL DCI for one fallback usage indicating (counter) DAI=1 while scheduling a PDSCH associated with an enabled HARQ process on the PCell, and all of the remaining received DCI and/or PDSCH(s) are associated with a disabled HARQ process Condition 2. In case of that one (or multiple) SPS PDSCH associated with the enabled HARQ process is received and all of the remaining received DCI and/or PDSCH(s) are associated with a disabled HARQ process When operating as the method proposed in this embodiment, there is an advantage in that the size of the HARQ-ACK codebook can be reduced by excluding the HARQ-ACK configuration for the PDSCH associated with disabling HARQ feedback.

In addition, in the present disclosure, as described above, in the case of the Type 1 HARQ-ACK codebook, a codebook enhancement scheme in which the terminal fills the NACK for the disabled HARQ process and reports it to the base station is introduced. In this case, the base station may recognize in advance HARQ-ACK information for the PDSCH (or transport block (TB)) associated with the disabled HARQ process. Therefore, in order to increase the power consumption efficiency of the terminal, when transmitting the PUCCH, the PUCCH transmission power may be calculated by excluding the HARQ-ACK bit corresponding to the PDSCH (or TB) associated with the above-described disabled HARQ process.

Table 14 shows the PUCCH transmission power related content in the NR system.

TABLE 14

- For a PUCCH transmission using PUCCH format 2 or PUCCH format 3 or PUCCH format 4 and for a number of UCI bits smaller than or equal to 11; $\Delta_{TF,b,f,c}(i) = 10\log_{10}(K_1 \cdot$ TABLE 14-continued $(n_{HARQ-ACK}(i) + O_{SR}(i) + O_{CSI}(i)/N_{RE}(i)$, where
- $K_1 = 6$
- $n_{HARQ-ACK}(i)$ is a number of HARQ-ACK information bits that the UE determines as described in clause 9.1.2. 1 or 16.5.1.1 for Type-1 HARQ-ACK codebook and as described in clause 9.1.3. 1 or 9.1.3.3 or 16.5.2. 1 for Type-2 HARQ-ACK codebook, $n_{HARQ-ACK}(i)$ is the same as $O_{ACK}(i)$ as described in clause 9.1.4 for Type-3 HARQ-ACK codebook. If the UE is not provided any of pasch-HARQ-ACK-Codebook, pdsch-HARQ-ACK-Codebook-r16, or pdsch-HARQ-ACK-OneShotFeedback, $n_{HARQ-ACK}(i) = 1$ if the UE includes a HARQ-ACK information bit in the PUCCH transmission; otherwise, $n_{HARQ-ACK}(i) = 0$
- $O_{SR}(i)$ is a number of SR information bits that the UE determines as described in clause 9.2.5.1
- $O_{CSI}(i)$ is a number of CSI information bits that the UE determines as described in clause 9.2.5.2
- $N_{RE}(i)$ is a number of resource elements determined as $N_{RE}(i) = M_{RB,b,f,c}^{PUCCH}(i) \cdot N_{sc,ctrl}^{RB}(i) \cdot N_{symb-UCI,b,f,c}^{PUCCH}(i)$, where $N_{sc,ctrl}^{RB}(i)$ is a number of subcarriers per resource block excluding subcarriers used for DM-RS transmission, and $N_{symb-UCI,b,f,c}^{PUCCH}(i)$ is a number of symbols excluding symbols used for DM-RS transmission, as defined in clause 9.2.5.2, for PUCCH transmission occasion i on active UL BWP b of carrier f of primary cell c Referring to Table 14, the portion of the PUCCH transmission power that the HARQ-ACK bit is involved in is $\Delta_{TF,b,f,c}(i)$ for PUCCH format 2/3/4, as in $\Delta_{TF,b,f,c}(i)=10 \log_{10}(K_1 \cdot (n_{HARQ-ACK}(i)+O_{SR}(i)+O_{CSI}(i))/N_{RE}(i))$, the value of the $\Delta_{TF,b,f,c}(i)$ increases as the number of HARQ-ACK bits increases. As described above, if the pre-known NACK bit for the disabled HARQ process of the Type 1 HARQ-ACK codebook is omitted, the $\Delta_{TF,b,f,c}(i)$ decreases, as a result, the PUCCH transmission power may be lowered.

However, if all HARQ processes are disabled, problems may arise in determining the $\Delta_{TF,b,f,c}(i)$. According to the equation in Table 14, if all HARQ processes are disabled, nHARQ-ACK(i) is determined to be 0, and if OSR(i) and OCSI(i) are not multiplexed with HARQ-ACK information, the value of $\Delta_{TF,b,f,c}(i)$ may be will be log 10(0), which can be an undefined (-infinity) value. In order to prevent such a problem, the present disclosure proposes the following method (hereinafter, Embodiment 3).

Embodiment 3

This embodiment relates to a method of determining PUCCH transmission power in consideration of enabling/disabling of the HARQ process.

For example, in case of that PUCCH format is 2/3/4 and the number of UCI bits is less than or equal to 11, when transmitting PUCCH, Type 1 HARQ-ACK codebook may be used, and when all HARQ processes associated with HARQ-ACK codebook are disabled, the terminal may determine the PUCCH transmission power by assuming the value of nHARQ-ACK(i) as a specific value (e.g., 1).

As another example, the corresponding method may be limitedly applied in case of that OSR(i)=OCSI(i)=0. As another example, when nHARQ-ACK(i)+OSR(i)+OCSI(i)=0, the terminal may calculate $\Delta_{TF,b,f,c}(i)$ using the minimum value that may be assumed, by assuming that nHARQ-ACK(i)+OSR(i)+OCSI(i)=1 or that the value of K1*(nHARQ-ACK(i)+OSR(i)+OCSI(i)) in log 10 of the above equation is 1. As another example, when all of the HARQ processes associated with the above-described HARQ-ACK codebook are disabled (i.e., feedback-disabled), the terminal may calculate/apply the PUCCH transmission power by assuming that the $\Delta_{TF,b,f,c}(i)$ of the PUCCH transmission power equation is 0.

Since the examples of the above-described proposed methods in the present disclosure may be included as one of the implementation methods of the present disclosure, it is obvious that they may be regarded as a kind of proposed methods. In addition, the above-described proposed methods may be implemented independently, but may also be implemented in the form of a combination (or merge) of some of the proposed methods.

In addition, information or rule on whether or not the proposed methods described above in the present disclosure may be transferred through signaling (e.g., physical layer signaling, higher layer signaling, etc.) predefined by the base station to the terminal. As an example, the higher layer signaling may include one or more of a functional layer such as a MAC layer, an RLC layer, a PDCP layer, an RRC layer, and an SDAP layer.

Figure 12:
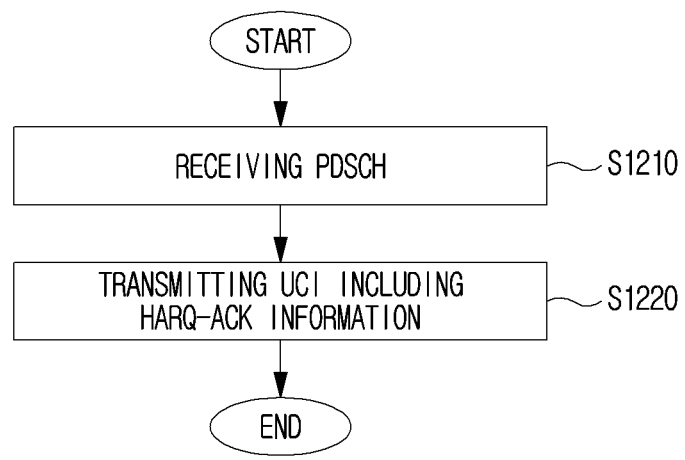
FIG. 12 is a flowchart illustrating an operation of transmitting uplink control information of a terminal according to an embodiment of the present disclosure.

FIG. 12 is a flowchart illustrating an operation of transmitting uplink control information of a terminal according to an embodiment of the present disclosure.

FIG. 12 illustrates an operation of a terminal based on the previously proposed method (e.g., any one or a combination of Embodiments 1 to 3 and detailed embodiments thereof). The example of FIG. 12 is for convenience of description, and does not limit the scope of the present disclosure. Some step(s) illustrated in FIG. 12 may be omitted depending on circumstances and/or configuration. In addition, the terminal in FIG. 12 is only one example, and may be implemented as the apparatus illustrated in FIG. 15 below. For example, the processor 102/202 of FIG. 15 may control to transmit and receive channel/signal/data/information (e.g., RRC signaling, MAC CE, DCI for UL/DL scheduling, SRS, PDCCH, PDSCH, PUSCH, PUCCH, etc.) using the transceiver 106/206, and may control to store channel/signal/data/information to be transmitted or received in the memory 104/204.

Referring to FIG. 12, in step S1210, the terminal may receive the PDSCH from the base station.

For example, as in the above-described embodiment of the present disclosure (e.g., in particular, Embodiment 1), the terminal may receive a plurality of PDSCHs including a plurality of SPS PDSCHs from the base station. That is, the PDSCH received by the terminal from the base station may correspond to a PDSCH according to scheduling based on DCI and/or a PDSCH (e.g., SPS PDSCH) based on an activation by higher layer configuration and DCI.

Thereafter, in step S1220, the terminal may transmit UCI (Uplink Control Information) including HARQ-ACK information to the base station. Here, the corresponding HARQ-ACK information may be based on the PDSCH in step S1210.

For example, as in the above-described embodiment of the present disclosure (eg, in particular, Embodiment 1), the HARQ-ACK information reported by the terminal to the base station may include HARQ-ACK information for a general PDSCH and/or HARQ-ACK information for the SPS PDSCH.

Here, when the HARQ-ACK information for a plurality of SPS PDSCHs is multiplexed by appending to the pre-configured HARQ-ACK information, the HARQ-ACK information included in the UCI reported by the terminal may be determined by excluding at least one SPS PDSCH associated with a disabled HARQ process among the plurality of the SPS PDSCHs.

In this regard, the pre-configured HARQ-ACK information may mean a HARQ-ACK codebook for a general PDSCH (e.g., PDSCH by DCI scheduling, etc.), and as a specific example, the pre-configured HARQ-ACK information may correspond to the Type 2 HARQ-ACK codebook based on the PDSCH HARQ-ACK codebook parameter (e.g., pdsch-HARQ-ACK-Codebook=dynamic) dynamically configured through higher layer signaling. That is, in step S1210, the HARQ-ACK information included in the UCI reported by the terminal may be determined, except for HARQ-ACK bit(s) for at least one SPS PDSCH associated with the disabled HARQ process, by appending HARQ-ACK bit(s) for a remaining SPS PDSCH to HARQ-ACK bit(s) for the Type 2 HARQ-ACK codebook. In other words, the size of the codebook related to the HARQ-ACK information included in the UCI may be determined by considering only the enabled HARQ process.

In addition, although not shown in FIG. 12, the terminal may receive information on whether the HARQ process is disabled from the base station through higher layer signaling (e.g., RRC signaling, etc.). Here, whether or not to disable the HARQ process may be configured in units of HARQ process IDs, and may be configured in the form of a bitmap. As in the above-described embodiment of the present disclosure (e.g., in particular, Embodiment 1), when all HARQ processes associated with a plurality of SPS PDSCHs received by the terminal are disabled, HARQ-ACK information for a corresponding plurality of SPS PDSCHs may be excluded/omitted in the HARQ-ACK information included in the UCI reported by the terminal.

That is, for the received PDSCHs, the terminal may be configured/defined to determine/report the HARQ-ACK codebook (e.g., Type 2 HARQ-ACK codebook, HARQ-ACK codebook for SPS PDSCH, etc.) by considering only the PDSCH associated with the enabled HARQ process.

Figure 13:
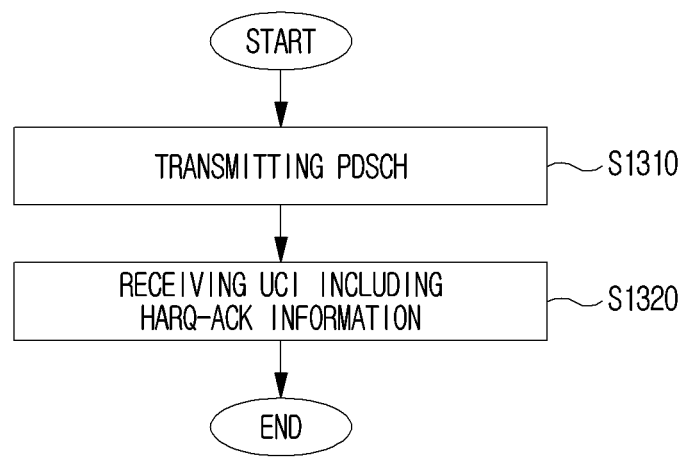
FIG. 13 is a flowchart illustrating an operation of receiving uplink control information of a base station according to an embodiment of the present disclosure.

FIG. 13 is a flowchart illustrating an operation of receiving uplink control information of a base station according to an embodiment of the present disclosure.

FIG. 13 illustrates an operation of a base station based on the previously proposed method (e.g., any one or a combination of Embodiments 1 to 3 and detailed embodiments thereof). The example of FIG. 13 is for convenience of description, and does not limit the scope of the present disclosure. Some step(s) illustrated in FIG. 13 may be omitted depending on circumstances and/or configuration. In addition, the base station in FIG. 13 is only one example, and may be implemented as the apparatus illustrated in FIG. 15 below. For example, the processor 102/202 of FIG. 15 may control to transmit and receive channel/signal/data/information (e.g., RRC signaling, MAC CE, DCI for UL/DL scheduling, SRS, PDCCH, PDSCH, PUSCH, PUCCH, etc.) using the transceiver 106/206, and may control to store channel/signal/data/information to be transmitted or received in the memory 104/204.

Referring to FIG. 13, in step S1310, the base station may transmit the PDSCH to the terminal.

For example, as in the above-described embodiment of the present disclosure (e.g., in particular, Embodiment 1), the base station may transmit a plurality of PDSCHs including a plurality of SPS PDSCHs to the terminal. That is, the PDSCH transmitted by the base station to the terminal may correspond to a PDSCH according to scheduling based on DCI and/or a PDSCH (e.g., SPS PDSCH) based on an activation by higher layer configuration and DCI.

Thereafter, in step S1320, the base station may receive UCI (Uplink Control Information) including HARQ-ACK information from the terminal. Here, the corresponding HARQ-ACK information may be based on the PDSCH in step S1310.

For example, as in the above-described embodiment of the present disclosure (eg, in particular, Embodiment 1), the HARQ-ACK information reported by the terminal to the base station may include HARQ-ACK information for a general PDSCH and/or HARQ-ACK information for the SPS PDSCH.

Here, when the HARQ-ACK information for a plurality of SPS PDSCHs is multiplexed by appending to the pre-configured HARQ-ACK information, the HARQ-ACK information included in the UCI reported by the terminal may be determined by excluding at least one SPS PDSCH associated with a disabled HARQ process among the plurality of the SPS PDSCHs.

In this regard, the pre-configured HARQ-ACK information may mean a HARQ-ACK codebook for a general PDSCH (e.g., PDSCH by DCI scheduling, etc.), and as a specific example, the pre-configured HARQ-ACK information may correspond to the Type 2 HARQ-ACK codebook based on the PDSCH HARQ-ACK codebook parameter (e.g., pdsch-HARQ-ACK-Codebook=dynamic) dynamically configured through higher layer signaling. That is, in step S1310, the HARQ-ACK information included in the UCI reported by the terminal may be determined, except for HARQ-ACK bit(s) for at least one SPS PDSCH associated with the disabled HARQ process, by appending HARQ-ACK bit(s) for a remaining SPS PDSCH to HARQ-ACK bit(s) for the Type 2 HARQ-ACK codebook. In other words, the size of the codebook related to the HARQ-ACK information included in the UCI may be determined by considering only the enabled HARQ process.

In addition, although not shown in FIG. 13, the base station may transmit information on whether the HARQ process is disabled to the terminal through higher layer signaling (e.g., RRC signaling, etc.). Here, whether or not to disable the HARQ process may be configured in units of HARQ process IDs, and may be configured in the form of a bitmap. As in the above-described embodiment of the present disclosure (e.g., in particular, Embodiment 1), when all HARQ processes associated with a plurality of SPS PDSCHs received by the terminal are disabled, HARQ-ACK information for a corresponding plurality of SPS PDSCHs may be excluded/omitted in the HARQ-ACK information included in the UCI reported by the terminal.

That is, for the received PDSCHs, the terminal may be configured/defined to determine/report the HARQ-ACK codebook (e.g., Type 2 HARQ-ACK codebook, HARQ-ACK codebook for SPS PDSCH, etc.) by considering only the PDSCH associated with the enabled HARQ process.

Figure 14:
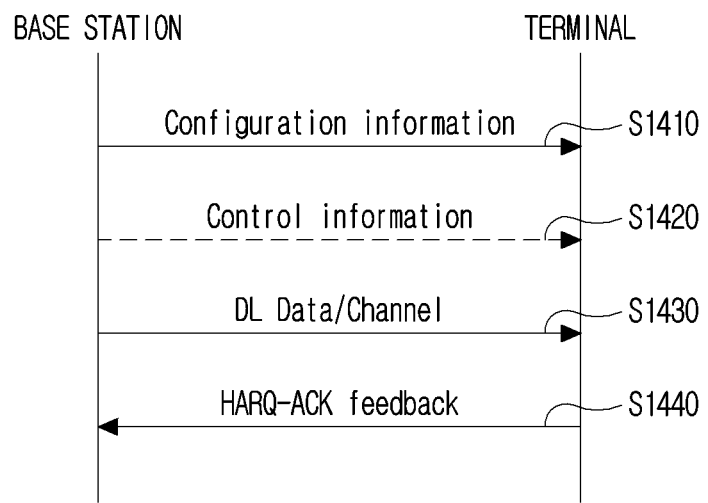
FIG. 14 is a diagram for explaining a signaling process between a base station and a terminal according to an embodiment of the present disclosure.

FIG. 14 is a diagram for explaining a signaling process between a base station and a terminal according to an embodiment of the present disclosure.

FIG. 14 illustrates a signaling operation between a base station and a terminal based on the previously proposed method (e.g., any one or a combination of Embodiments 1 to 3 and detailed embodiments thereof). The example of FIG. 14 is for convenience of description, and does not limit the scope of the present disclosure. Some step(s) illustrated in FIG. 14 may be omitted depending on circumstances and/or configuration. In addition, the base station/terminal in FIG. 14 is only one example, and may be implemented as the apparatus illustrated in FIG. 15 below. For example, the processor 102/202 of FIG. 15 may control to transmit and receive channel/signal/data/information (e.g., RRC signaling, MAC CE, DCI for UL/DL scheduling, SRS, PDCCH, PDSCH, PUSCH, PUCCH, etc.) using the transceiver 106/206, and may control to store channel/signal/data/information to be transmitted or received in the memory 104/204.

Although not shown in FIG. 14, in relation to the previously proposed method (e.g., any one or a combination of embodiments 1 to 3 and detailed embodiments thereof), a default HARQ operation mode of the terminal may be configured in a previous step of RRC connection/configuration. For example, when it is indicated that the cell (accessed by the terminal) is an NTN cell through PBCH (MIB) or SIB, the terminal may recognize that the default mode is configured to HARQ-disabled. For example, the base station may indicate one of the HARQ-disabled configuration and the HARQ-enabled configuration(s) as the default operation mode through the PBCH (MIB) or SIB (e.g., when indicated by the NTN cell).

In addition, although not shown in FIG. 14, in relation to the previously proposed method (e.g., any one or a plurality of combinations of Embodiments 1 to 3 and detailed embodiments thereof), the terminal may report UE capability information to the base station. For example, the UE capability information may include information on the number of times of channel (e.g., PDSCH) repetition reception/slot aggregation level information/the number of supportable HARQ processes, etc. which is supportable/recommended by the terminal. For example, the UE capability information may be reported periodically/semi-persistently/aperiodically. The base station may configured/indicate the operations to be described below in consideration of the capability of the terminal.

In step S1410, the base station may transmit configuration information to the terminal. That is, the terminal may receive configuration information from the base station. For example, the configuration information is NTN-related configuration information related to the previously proposed method (e.g., any one or a combination of Embodiments 1 to 3 and detailed embodiments thereof)/configuration information for DL transmission/reception (e.g., PDCCH-config/PDSCH-config)/HARQ process-related configuration (e.g., whether HARQ feedback is enabled/disabled/number of HARQ processes/HARQ process ID, etc.) and the like. For example, the configuration information may be transmitted through higher layer signaling (e.g., RRC signaling, MAC-CE based signaling, etc.).

As a specific example, whether to enable/disable HARQ feedback may be configured per cell group/HARQ process (e.g., HARQ process ID). For example, whether to enable/disable the HARQ feedback may be configured through information in the form of a bitmap.

Also, for example, the configuration information may include an aggregation factor/PDSCH repetition transmission related configuration (e.g., number of repetitions/repetition pattern, etc.). In addition, the configuration information may include a dl-DataToUL-ACK parameter. As a specific example, a plurality of integer values from 0 to 31 may be indicated based on the dl-DataToUL-ACK parameter.

In step S1420, the base station may transmit control information to the terminal. That is, the terminal may receive control information from the base station. Here, the control information may be transmitted/received through DCI. The step of transmitting/receiving the corresponding control information may be omitted in certain cases (e.g., in the case of PDSCH transmission/reception in which DCI-based scheduling information indication is not required).

For example, the control information may include control information for DL data/channel transmission/reception/scheduling information/resource allocation information/HARQ feedback related information (e.g., New data indicator/Redundancy version/HARQ process number/Downlink assignment index/TPC command for scheduled PUCCH/PUCCH resource indicator/PDSCH-to-HARQ_feedback timing indicator)/Modulation and coding scheme/Frequency domain resource assignment, etc. For example, the DCI may be one of DCI format 1_0 or DCI format 1_1.

For example, the control information may include DCI indicating activation/deactivation for the SPS PDSCH.

For example, in the previously proposed method (e.g., any one or a combination of embodiments 1 to 3 and detailed embodiments thereof), based on the DCI, whether HARQ feedback enable/disable may be configured. For example, whether HARQ feedback enable/disable may be configured based on the PDSCH-to-HARQ feedback timing indicator field/PUCCH resource indicator field of DCI. For example, the number of HARQ processes may be configured to 16/32 or more, and the HARQ process ID may be distinguished based on the HARQ process number field included in the DCI and the index of the CCE/RB associated with the DCI.

In step S1430, the base station may transmit DL data/DL channel (e.g., PDSCH) to the terminal. That is, the terminal may receive DL data/DL channel from the base station. For example, the DL data/DL channel may be transmitted/received based on the above-described configuration information/control information. For example, DL data/DL channel may be transmitted/received in relation to the previously proposed method (e.g., any one or a combination of Embodiments 1 to 3 and detailed embodiments thereof).

In step S1440, the base station may receive HARQ-ACK feedback (i.e., HARQ-ACK information) from the terminal. That is, the terminal may transmit HARQ-ACK feedback to the base station. For example, as in the previously proposed method (eg, any one or a combination of embodiments 1 to 3 and detailed embodiments thereof), the HARQ-ACK feedback may be enabled/disabled. For example, based on whether HARQ-ACK feedback is enabled/disabled, HARQ-ACK feedback, that is, HARQ-ACK information, may be determined/configured. Here, the HARQ-ACK feedback/information may include ACK/NACK information (i.e., HARQ-ACK bit) for DL data/DL channel (i.e., PDSCH) transmitted from the base station. The HARQ-ACK feedback may be transmitted through PUCCH and/or PUSCH. In addition, like the previously proposed method (e.g., any one or a combination of Embodiments 1 to 3 and detailed embodiments thereof), the HARQ-ACK feedback/information reported by the terminal to the base station may be configured in the form of HARQ-ACK codebook (e.g., Type 1/2/3 HARQ-ACK codebook).

As mentioned above, the above-described operation of the terminal/base station and signaling between the base station and the terminal (e.g., Embodiments 1 to 3, FIGS. 12, 13, 14, etc.) may be implemented by an apparatus (e.g., FIG. 15) to be described below. For example, the base station may correspond to the first wireless device, the terminal may correspond to the second wireless device, and vice versa may be considered in some cases.

Figure 15:
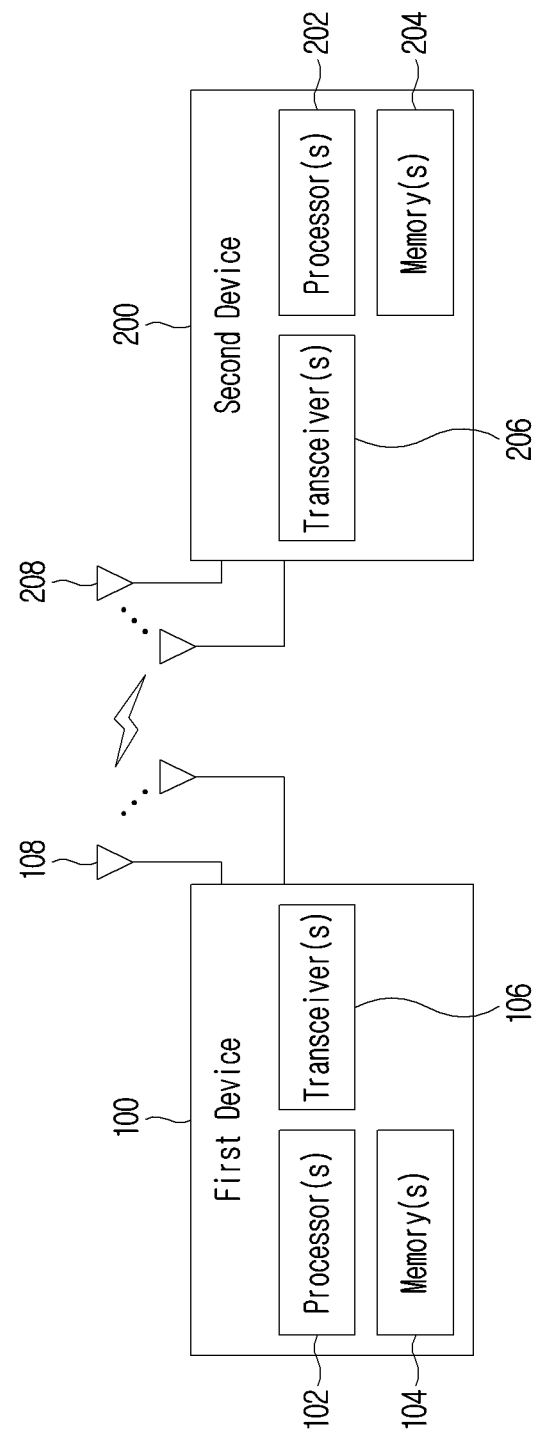
FIG. 15 is a diagram illustrating a block configuration diagram of a wireless communication apparatus according to an embodiment of the present disclosure.

For example, the above-described operation of the terminal/base station and signaling between the base station and the terminal (e.g., Embodiments 1 to 3, FIGS. 12, 13, 14, etc.) may be processed by one or more processors (102, 202) in FIG. 15, and the above-described operation of the terminal/base station and signaling between the base station and the terminal (e.g., Embodiments 1 to 3, FIGS. 12, 13, 14, etc.) may be stored in a memory (e.g., one or more memories (104, 204) in FIG. 15, in the form of instructions/programs (e.g., instructions, executable code) for driving at least one processor (102, 202) in FIG. 15.

General Device to which the Present Disclosure May be Applied

FIG. 15 illustrates a block diagram of a wireless communication device according to an embodiment of the present disclosure.

In reference to FIG. 15, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/ channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method comprising:
   receiving at least one physical downlink shared channel (PDSCH) and a plurality of semi-persistent scheduling (SPS) PDSCHs; and
   transmitting uplink control information including feedback information based on the at least one PDSCH and the plurality of SPS PDSCHs,
   wherein the feedback information includes first HARQ-ACK information related to the at least one PDSCH and second HARQ-ACK information related to the plurality of SPS PDSCHs, and
   wherein, based on the second HARQ-ACK information being multiplexed by appending to the first HARQ-ACK information, the second HARQ-ACK information is determined by excluding at least one SPS PDSCH for a disabled HARQ process among the plurality of SPS PDSCHs.

2. The method of claim 1, further comprising:
   receiving, from a base station, information for disabling of HARQ feedback through higher layer signaling.

3. The method of claim 2,
   wherein the disabling of HARQ feedback is configured in units of a HARQ process identifier (ID).

4. The method of claim 2,
   wherein, based on that all HARQ processes related to the plurality of SPS PDSCHs are disabled, the second HARQ-ACK information is excluded from the feedback information included in the uplink control information.

5. The method of claim 1,
   wherein the first HARQ-ACK information corresponds to a Type 2 HARQ-ACK codebook based on dynamically configured PDSCH HARQ-ACK codebook parameter.

6. The method of claim 5,
   wherein the second HARQ-ACK information included in the feedback information is determined, except for HARQ-ACK bit(s) for the at least one SPS PDSCH for the disabled HARQ process, by appending HARQ-ACK bit(s) for a remaining SPS PDSCH to HARQ-ACK bit(s) for the Type 2 HARQ-ACK codebook.

7. The method of claim 1,
   wherein a codebook size related to the second HARQ-ACK information included in the feedback information is determined by considering only an enabled HARQ process.

8. A non-transitory computer-readable medium storing at least one computer program comprising instructions that, when executed by at least one processor, cause the at least one processor to perform the method of claim 1.

9. An apparatus comprising:
   at least one transceiver for transmitting and receiving a wireless signal; and
   at least one processor for controlling the at least one transceiver, wherein the at least one processor configured to:
   receive at least one physical downlink shared channel (PDSCH) and a plurality of semi-persistent scheduling (SPS) PDSCHs; and
   transmit uplink control information including feedback information based on the at least one PDSCH and the plurality of SPS PDSCHs,
   wherein the feedback information includes first HARQ-ACK information related to the at least one PDSCH and second HARQ-ACK information related to the plurality of SPS PDSCHs, and
   wherein, based on the second HARQ-ACK information being multiplexed by appending to the first HARQ-ACK information, the second HARQ-ACK information is determined by excluding at least one SPS PDSCH for a disabled HARQ process among the plurality of SPS PDSCHs.

10. The apparatus of claim 9, wherein the at least one processor configured to:
    receive, from a base station, information for disabling of HARQ feedback through higher layer signaling.

11. The apparatus of claim 10,
    wherein the disabling of HARQ feedback is configured in units of a HARQ process identifier (ID).

12. The apparatus of claim 10,
    wherein, based on that all HARQ processes related to the plurality of SPS PDSCHs are disabled, the second HARQ-ACK information is excluded from the feedback information included in the uplink control information.

13. The apparatus of claim 9,
    wherein the first HARQ-ACK information corresponds to a Type 2 HARQ-ACK codebook based on dynamically configured PDSCH HARQ-ACK codebook parameter.

14. The apparatus of claim 13,
    wherein the second HARQ-ACK information included in the feedback information is determined, except for HARQ-ACK bit(s) for the at least one SPS PDSCH for the disabled HARQ process, by appending HARQ-ACK bit(s) for a remaining SPS PDSCH to HARQ-ACK bit(s) for the Type 2 HARQ-ACK codebook.

15. The apparatus of claim 9,
    wherein a codebook size related to the second HARQ-ACK information included in the feedback information is determined by considering only an enabled HARQ process.

16. A method comprising:
    transmitting at least one physical downlink shared channel (PDSCH) and a plurality of semi-persistent scheduling (SPS) PDSCHs; and
    receiving uplink control information including feedback information based on the at least one PDSCH and the plurality of SPS PDSCHs,
    wherein the feedback information includes first HARQ-ACK information related to the at least one PDSCH and second HARQ-ACK information related to the plurality of SPS PDSCHs, and
    wherein, based on the second HARQ-ACK information being multiplexed by appending to the first HARQ-ACK information, the second HARQ-ACK information is determined by excluding at least one SPS PDSCH for a disabled HARQ process among the plurality of SPS PDSCHs.

* * * * *